United States Patent
Nicholson

(10) Patent No.: US 6,542,267 B1
(45) Date of Patent: Apr. 1, 2003

(54) LIGHT RAMP 2000 FIBER OPTIC LOCAL ACCESS ARCHITECTURE

(76) Inventor: Paul James Nicholson, 300 Commercial St., Suite 27, Malden, MA (US) 02148-7309

(*) Notice: Subject to any disclaimer, the term of this patent is extended or adjusted under 35 U.S.C. 154(b) by 0 days.

(21) Appl. No.: 08/979,425

(22) Filed: Nov. 24, 1997

(51) Int. Cl.[7] .................... H04J 14/02; H04J 14/08
(52) U.S. Cl. ................ 359/119; 359/118; 359/137; 359/125
(58) Field of Search ................. 359/154, 124, 359/125, 126, 123, 135, 137, 118–119, 110; 370/352, 354; 385/89, 135

(56) References Cited

U.S. PATENT DOCUMENTS

| | | | | |
|---|---|---|---|---|
| 4,965,790 A | * | 10/1990 | Nishino et al. | 70/85.12 |
| 5,228,105 A | * | 7/1993 | Glista | 385/89 |
| 5,267,122 A | * | 11/1993 | Glover et al. | 361/704 |
| 5,282,207 A | * | 1/1994 | Jurkevich et al. | 370/110.1 |
| 5,349,457 A | * | 9/1994 | Bears | 359/118 |
| 5,373,386 A | * | 12/1994 | Bolze | 319/167 |
| 5,526,152 A | * | 6/1996 | Koai | 359/118 |
| 5,600,469 A | * | 2/1997 | Yamazaki | 359/315 |
| 5,602,884 A | * | 2/1997 | Wieczorkiewicz et al. | 375/376 |
| 5,621,728 A | * | 4/1997 | Lightfoot et al. | 370/60.1 |
| 5,781,320 A | * | 7/1998 | Byers | 359/123 |
| 5,867,496 A | * | 2/1999 | Peres et al. | 370/376 |

* cited by examiner

Primary Examiner—Leslie Pascal
(74) Attorney, Agent, or Firm—Burns & Levinson LLP; Frederick C. Williams; Yan Lan

(57) ABSTRACT

A passive fiber local access architecture and signaling plan is disclosed which enables the local exchange network to meet the need, as defined by the International Telecommunications Union(ITU) in References 7 and 8, for an economic means of providing a multitude of services to subscribers over a single medium. Integrating disparate signals compatibly and symmetrically over one medium dictates that all digital transmission and signaling at speeds in excess of 100 Mbps be used on the link. The additional bandwidth needed to support this expanded capacity demand points to glass fiber as the most suitable candidate for this role. A failure tolerant, diversely routed redundant ring cabling architecture provides a dedicated fiber or fiber pair to each premises from the local exchange carrier POP, eliminating the need for intermediate nodes. line power, signal splitters, amplifiers or metallic loops in the last mile. 12×12 cross connect units are deployed in the outside cable plant to meet user demand anywhere along the route, serving 500 or more homes from a single POP. The passive fiber subscriber line is activated and controlled by a set of out of band digital supervision signaling protocols that are compatible with Signaling System 7. These protocols replace existing DC loop closure supervision. Firmware is provided at both POP and subscriber ends of the link to administer and monitor link operations.

6 Claims, 20 Drawing Sheets

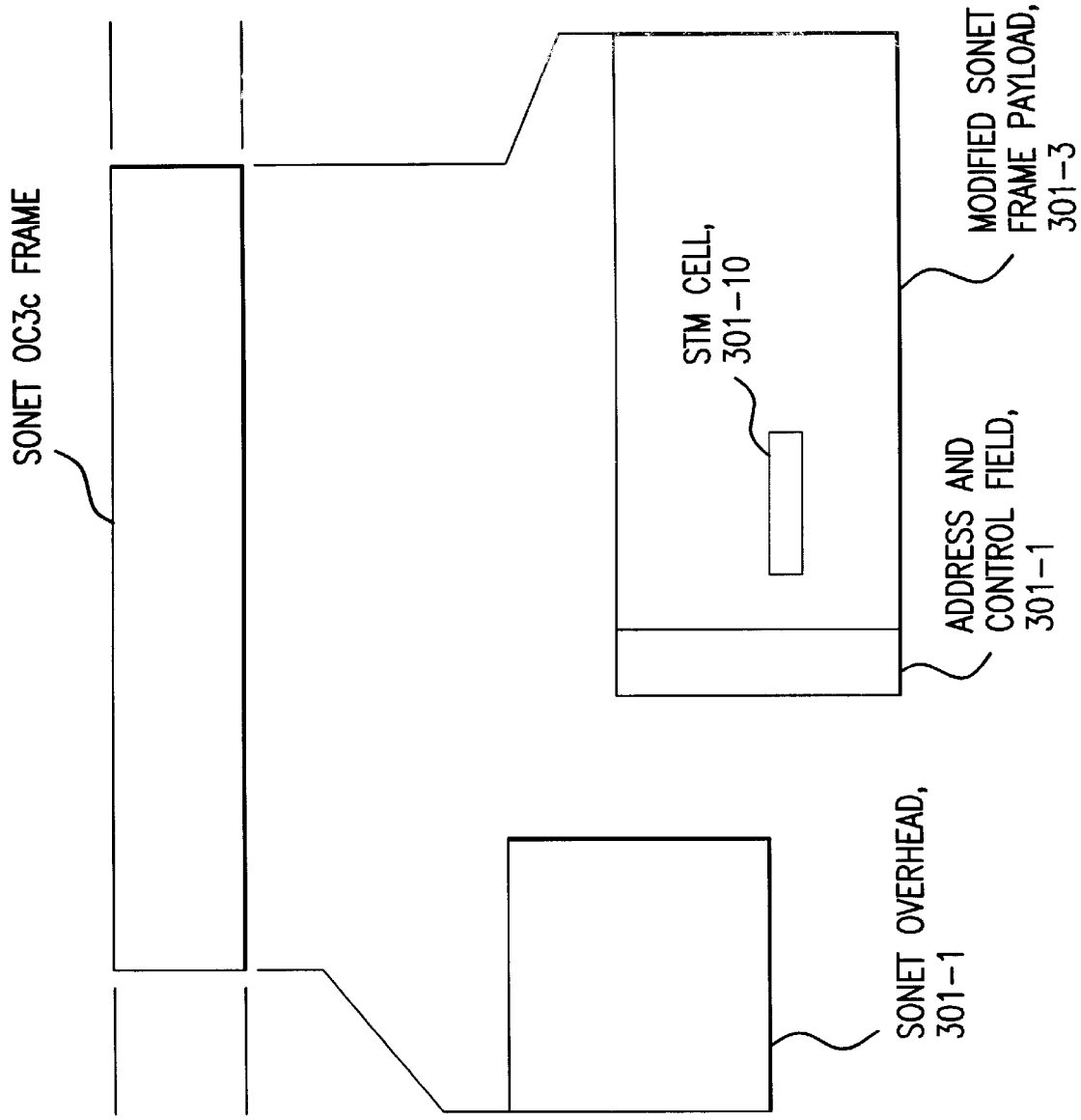

LIGHT RAMP 2000 FIBER OPTIC LOCAL ACCESS ARCHITECTURE

CROSS REFERENCES

Figure 1A:
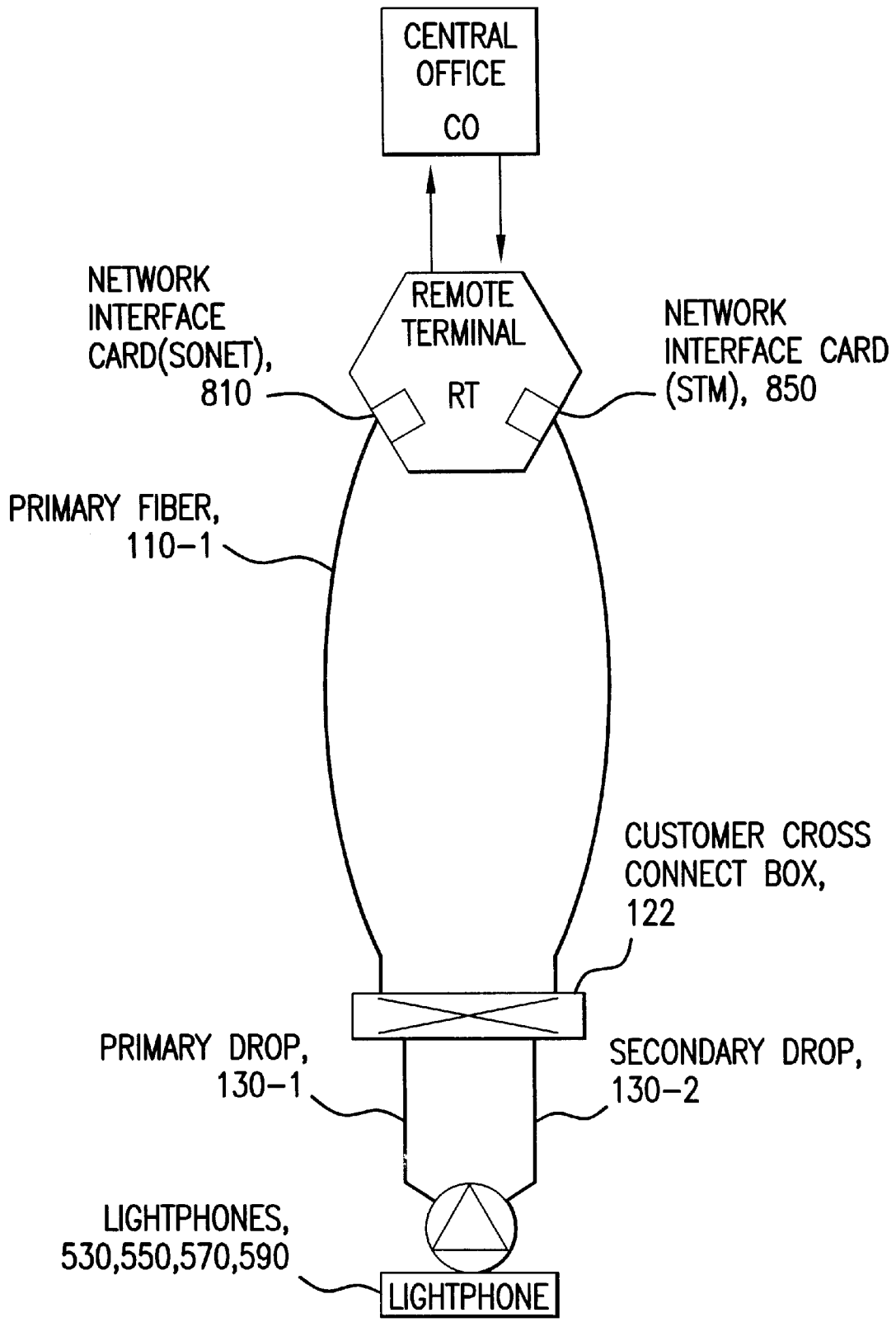

This section is omitted as there are no other related applications at present.

BACKGROUND OF THE INVENTION

1. Field of the Invention

The field of this application is multimedia digital optical communications, including telephony, data and video, both switched and non-switched.

2. Background Art

Search of Patent Depository

A search was conducted at the Boston Public Library, a U.S. Patent Depository. A total of 25 listings are on file for patents issued under subject heading: Telephone, Class-LightPhone, subclass—Optical Communications (359/149). No issued patent covers the design and application contemplated by LightRamp 2000. All extant patents predated 1986.

Other Background Art

Attempts to date to employ fiber optics in local access networks have focused on two architectures: (1) corporately fed passive fiber to the subscriber, using Tree and Branch architecture, featuring optical splitting of the main feed signal for distribution to separate destinations, and (2) fiber to the premise, in which individual fibers carry trunk signaling to an interface box, the signals then being converted to conventional telephone or cable drops. The first class of fiber to the residence employs a single main optical feed in which signals for multiple users are multiplexed. The corporately fed optical signal is then split into individual tributaries to each subscriber. In the British Telecom's TPON corporately fed fiber to the home scheme, long wavelength laser driven optics carry time division multiplexed traffic to multiple homes via optical splitter and propagated over a tree and branch structure. At the residence/premise the arriving traffic is then demultiplexed from the incoming high speed stream. Coding in the form of scrambling is utilized to prevent one subscriber from receiving another's messages.

A second type of Fiber to the Home (FTTH) employs a dedicated fiber pair to the premises, using digital trunk signaling. The fibers terminate at an interface unit at the entry to the premise. The remaining connections to telephones or other terminals are made over metallic wire, using conventional DC loop signaling. This type of design is exemplified by the experimental system tested by Bell South/Bell Northern Research at Heathrow, Fla., (Refs. 1 and 2). The Heathrow trial system successfully carried ISDN over a dedicated fiber pair to the premise, using trunk type digital signaling to the residence. The final drop to the telephone instrument from a side wall mounted demarcation interface box reused existing household wire pairs. These pairs carried out DC loop supervision and BORSHT functions generated by a SLIC located in the demarcation box. In effect, this arrangement was a single channel optical digital loop carrier to the residence.

The Heathrow scheme was characterized and limited by the following attributes:

(1) In using conventional tip and ring line supervision over the wire pair(s) extending from the demark unit to the telephone instrument, no new protocols were devised to achieve line supervision.

(2) fibers were employed for the Basic Rate ISDN(BRI) 2B+D service only, with one fiber in each direction. No other service was offered over the fiber pair.

(3) Laser technology was used at Heathrow, resulting in costs that are higher than permissible to satisfy the BellCo's deployment criteria; i.e., that first costs for the fiber must be comparable to a conventional metallic pair in order to justify an installation decision. More economical ELED technology was not then available. This dedication of transmission capacity to specific service, rather than combining multiple services one single medium, characteristic of traditional telephone practice, is not compliant with ITU ISDN goals.

(4) no video or wide band data was carried on the fiber, nor was ATM traffic attempted or feasible. Video (NTSC) was carried over separate coaxial cable in channelized analog form.

The Heathrow experiment, although technically successful, did not, in the opinion of the lead investigators from Bell South and BNR, lead to a design that was ready for introduction to the market. This was due to the a priori constraints imposed by the testers, as well as by the state of the electro-optical art prevailing in the late 1980 time frame. A number of major shortcomings to the overall design, admitted by the researchers, included the basic flaw of substituting fiber for wire on a per service one for one basis. This assumption failed to take advantage of the economics of scale and scope possible with fiber, which allows additional services to be added at minimal marginal cost. No such economies were sought or realized at Heathrow.

Limitations of Hybrid Fiber-Wire Connections to Premise

Almost all previous and current attempts to convey multimedia services traffic (voice, data, video) via fiber to a premise all use fiber to an intermediate nodal concentrator located in the neighborhood. The individual services are then separated and each delivered over separate media to the user. Typically, voice is conveyed over a twisted metallic pair, video is conveyed over coaxial cable, and data over two wire pairs. In every instance field tested to date, telephone service used conventional two wire metallic loops to provide both line supervision signaling and signal conveyance.

The three most frequently mentioned hybrid fiber/metallic designs are Fiber to the Curb(FTTC), Hybrid Fiber/Coax (HFC) and Asymmetrical Digital Subscriber Link(ADSL). In FTTC a node is located in the neighborhood within 800 feet of the premise/residence. This distance, fixed by the signaling capability of the wire pair, means that a local node can reach 16 residences in rural areas and 32 residences in cities. Alternative HFC designs planned by cable MSOs and some LECs utilize fiber to the service area (FSA), with the coaxial distribution reaching out to about 500 homes. In HFC/FSA the required cable run exceeds 1400 feet, requiring line extension amplifiers. A single coaxial cable serves many subscribers with one way video service. In some cases two way data service is also offered. In that event two way amplifiers are needed beyond 1000 feet. ADSL has a different feeder structure, but is nearly identical to FTTC over the last 'mile'.

The use of a fiber feeder and metallic distribution/drop combination in FTTC and ADSL carries with it the following burdens which are eliminated in the all passive structure of Light Ramp 2000: (a) an active intermediate node is required to convert and distribute the signals and thirty two or more such nodes are required per square mile; (b) the active intermediate node, also called an Optical Network Unit (ONU), delivers dial tone, ringing, and on hook/off hook status, among other line supervisory functions in order to support telephone service. They are known as the BORSHT functions and are implemented by a subscriber line interface circuit (SLIC). The BORSHT functions require a current carrying DC metallic loop and are not portable over fiber, which is electrically non-conductive; (c) to perform its functions the ONU requires an electrical power source, typically provided via a separate power feed from the Telco Central Office or local remote terminal(RT); finally, (d) the two wire metallic drop is severely limited in bandwidth and distance, restricting true broadband services to one direction only over an 800 foot drop. In effect this capability includes only entertainment and highly asymmetrical data retrieval services. Thus, the introduction of true symmetrical two way wide band digital services, requiring greater than 1–2 Mbps in each direction, is severely restricted and is generally precluded over conventional telephone wire over distances exceeding 1000 feet.

In view of their wire limitations, Hybrid Fiber-Coax or Hybrid Fiber-Metallic systems are considered as interim configurations, in anticipation of eventual extension of fiber directly to the home(FTTH) or business premise(FTTB). The Regional Bell Operating Companies have stated that FTTH is the eventual goal. Knowledgeable practitioners have stated that the high peak data rates anticipated in the loop part of the network will push optical fiber 'all the way' into residences. (Ref. 3)

Limitations In the Traditional Telephone D.C. Local Loop

For many decades telephone connections to the premise have used DC powered metallic loops extending from telephone company subscriber line interface circuits (SLICs), located either at the central office (switch) or, more recently, at local neighborhood concentrators. Service provided via these local concentrators is referred to as Digital Loop Carriage (DLC) where the connection back to the telco central office is made by a trunk carrying 24/48 digital channels.

This DC current loop is a typically a 24 or 26 AWG twisted wire pair extending up to 12 kft and terminating, when the hook switch is in the 'off hook' or 'on' position, into a 100–150 ohm load—the telephone. The combination of battery, wire loop and telephone constitutes a DC conductive path over which dial tone and ringing and other audibles are provided and on/off hook line supervision is exercised. The traditional loop also carried address signaling, either dialing pulses from rotary phones, or more recently tone pairs from touch tone sets. These telephones are analog instruments, because the standing loop current modulated by the carbon microphone is nearly the exact analog to the undulations of the human voice. This is Alexander Graham Bell's principle but not only invention.

Thus the continuing use to the DC loop for line supervision virtually guarantees that multiple wires continue to extend to the premise and that service over the single telephone line will be severely restricted. This practice defeats the goal, established by the International Telecommunications Union (ITU) for the Integrated services digital Network (ISDN), of integrating all forms of transmission over a single medium.

Limitations of four wire ISDN

In digital ISDN the DC loop merely functions to perform on/off hook line supervision and to power the phone. The standing loop current is no longer modulated by the human voice, or any other continuous tone. Instead, voice samples are quantified into a sequence of digital samples which become a fast digital representation of the original, to be reconstructed at the receiving end. In between the two telephones, the information flow is entirely digital and an additional metallic pair is required to achieve full duplex operation.

Since a voice signal in ISDN is fundamentally digital there is no analog representation of the voice signal anywhere in the channel. Voice digitization occurs within the telephone instrument and is performed by a circuit known as a coder/decoder (CODEC). Voice occurs only in its natural form at the output of this circuit, where the receiving CODEC and transducer change the discrete electrical signal back to acoustic. In becoming a purely digital instrument, the ISDN telephone inherently accommodates other forms of digital traffic, such as base band data from a computer, or other digitized signals, such as compressed video. However, there are physical limits that prevent metallic ISDN from providing a general purpose digital telephone service.

In summary the limitations of four wire ISDN are:
(a) two wire pairs are needed to support full duplex operation of ISDN
(b) not all wire pairs are eligible and testing is required to determine eligibility
(c) wire based ISDN is subject to distance limitations As a result of these limitations ISDN, if provided over wire pairs, requires a local neighborhood node to serve more distant users; or else, only these within the acceptable signaling distance qualify for service. This constraint penalizes neighborhoods with older embedded wire plant.

Limitations of Alternative Conductive Wire Bases Schemes: Asymmetrical Digital Subscriber Link (ADSL/B-ADSL) and Fiber to the Curb (FTTC)

New or Revised Telephone Loop Designs are now being promoted for the purpose of expanding the bandwidth of Hybrid Fiber/Metallic designs to deliver a greater array of services, with strong emphasis on video for entertainment purposes. These can roughly be categorized as (1) Enhanced Wire Based Schemes, and (2) Coaxial delivery schemes, usually with a fiber optic feeder.

The enhanced wire based scheme, ADSL, is currently used in limited trunk applications. ADSL is being strongly promoted on the basis that it avoids presumably expensive installation of fiber and takes advantage of existing conductive wire plan. Asymmetrical service is justified on the basis that Internet access currently enjoys a 10:1 asymmetry in favor of downstream traffic and that traffic is dominated by entertainment video. This ratio changes dramatically when two wave digital services are introduced.

ADSL is severely limited in both signaling distance (less than 12 kft tested), and data carrying capacity. This limitation is particularly noticeable in the upstream direction. Furthermore, as data rate goes up, signaling distance goes down. The highest rate claimed, not yet proven operationally, is 25 Mbps with a corresponding reach of 3 kft. Only 1.544 Mbps over two pairs has been demonstrated up to 12,000 feet.( Ref. 4 and 5). ADSL therefore generally needs a local hub or roadside CO supplied by feeder trunks in order to reach most subscribers. The feeder portion of the ADSL/B-ADSL network does not yet exist, makes extensive use of fiber, and will be costly to install. Reuse of existing or planned SONET facilities is not an option.

ADSL is an inherently asymmetrical transmission facility which achieves high speed in one direction, typically 1.5 to 6.2 Mbps, and provides full duplex digital data at 64–640 Kbps. These rates are only achievable over 50 percent of telephone lines. Single line plain old telephone service (POTS) is supplied over separate wire pairs but over the final drop it occupies the 0–4 KHz band in combination with other signals on the single wire pair to the residence.

The current ADSL 6.2 Mbps capacity incorporated in ANSI T1E1.4 Standards, will be too slow to support one or two MPEG-2 video channels, let alone broadband services. At least 25–50 Mbps would be needed, and has yet to be demonstrated. The development at 25 Mbps, now at the laboratory stage, is said to be capable of reaching about 3 kft, serving 100 or more homes. A 52 Mbps prototype transceiver extending 700–800 feet was scheduled for beta testing in the second quarter of 1996. (References 4 and 5). This receiver, being developed for Fiber to the Curb(FTTC), will most likely also be adopted for ADSL. It is apparent from published data that the 400 feeders to the ONU nodes from the CO, required in both ADSL and FTTC for a model town, total 384 cable miles of costly OC12/24 six fiber asymmetrical transmission cable. These constitute a much greater combined investment in fiber and optoel-ectronics than the simple single ring cable of the Light ramp 2000 design. The latter reuses current and planned SONET fiber.

Limitations of ADSL and FTTC are seen more clearly when deployments are compared in a model town used by ADSL designers. This model is a 4×4 mile square (16 sq. mi.) containing 10,000 homes, of which 6000 are in the outskirts and 4000 in-town. In-town is considered the inner 2×2 square (4 mi.square).

Using signaling rate of 52 Mbps constrains the reach to each residence to 800 feet, theoretically serving 16 rural homes and 32 city homes from each node. In the model town, street mile density in the outskirts is approximately 70 homes/mile, allowing an 800 foot drop to reach 16 residences. Altogether 504 nodes would be required for the entire town. By contrast, with passive fiber links to the residence as in the preferred mode of this application, only 16 RTs ( one per square mile) would be needed.

The inventors and proponents of ADSL (Reference 6) admits that this scheme is an interim solution, awaiting the arrival of fiber to the premise.

Conclusions Regarding Limitations of Fiber to the Curb (FTTC)

Fiber To The Curb(FTTC) is a hybrid design in which fiber comes to the immediate neighborhood, serving from 8 to 32 homes. Drops to the premise will be conventional wire pairs carrying traffic at either 25 or 52 Mbps. Traffic from the Telco hub to the neighborhood concentrator, known as an ONU (optical network unit) is carried over both coaxial cable and fiber. In addition to requiring power to the ONU, FTTC handles switched video on a compressed basis and does not convey switched uncompressed broadcast video, as will Light Ramp. Selection and switching of the video content occurs at the head end, generally colocated with the telephone central office. Some distribution switching or routing of signals occurs at the ONU. This arrangement requires up to two OC12 (622 Mbps) feeders to each ONU.

FTTC incurs unattractive costs due to the need to provide a dedicated coax or reengineered wire pair to each residence rather than providing a more economical shared coax, as in conventional CATV and HFC. As we show later, Light Ramp provides a dedicated fiber, with sharing of the single 1fiber by many services. This is an economy of scope, which however is competitive with POTS over metallic pairs on both a first cost and operating cost basis. Therefore additional services and their associated revenue streams are not needed to justify, decision to install Light Ramp 2000.

Essential differences are that FTTC requires a local concentrator (ONU), power to that concentrator, and provides many channels of compressed video. Over the feeder portion of the network telephone lines are also provided over DLC rather than on individual pairs, as in ADSL. Light Ramp is totally passive over the connection from Telco to the premise, requires no local node and therefore needs no power down the line or from local supply. Therefore the differences between Light Ramp 2000 and FTTC are fundamental and no simple upgrade of FTTC will transform it into Light Ramp.

BRIEF SUMMARY OF THE INVENTION

The primary object of Light Ramp 2000 is to obviate the above noted disadvantages of the prior art.

It is a further object to provide secure, switchable dial up nearly error free wide band local access to the Public Switched Networks(PSNs) over totally passive fiber optic architecture, such that ITU criteria for ISDN and B-ISDN (Refs. 7 and 8) are satisfied.

It is a further object of the design to dispense with existing metallic loops and coaxial cables for the last mile by providing a new set of signaling protocols needed to support line supervision signaling in place of the DC metallic loop.

A further object is to provide dial up capability for both multimedia and conventional telephone calls, including ISDN, over fiber from anywhere within the 6–8 KM short or 10 KM long reach of the fiber extending from the local node.

A further object is to provide multimedia services over a single medium in a cost effective manner, such that local Exchange Carrier first cost installation criteria are met.

These and other advantages and objects are provided for herein. A diverse routing of a passive fiber pair to the premise is provided by the ring architecture of Light Ramp 2000. By virtue of its signaling distance and bandwidth, this design will be capable of carrying multiple digital signals at rates in excess of 100 Mbps both to and from business and residential premises over one or both fibers. SONET OC-3$c$ (155 Mbps) or greater capacity is offered in both directions by using wavelength division multiplexing (WDM) on each branch of the ring. Thus simultaneous transmission of uncompressed video as well as multiple voice and data channels are supported. Broadband services such as distance learning, video conferencing, and telemedicine, as well as dial up digital voice and data transmission over the single medium are thereby enabled. Bandwidth and distance constraints of the metallic wire pair are eliminated, and an improvement factor in data throughput of over 1000 to 1 is achieved relative to switch 56 kbps modem links.

Inherent economy in the design achieved by use of dedicated passive fiber(s) over 'the last mile' via a single shared cable, in combination with low power ELEDs, will allow service to the residential user at more affordable rates than possible with the use of multiple conductors. In addition to low first costs, less than that of a single telephone wire, operating costs are much lower. Once installed, the inert non-conductive glass medium will be virtually maintenance free and outside plant maintenance actions will be limited to occasional visits to a single on pole cross connect box.

Light Ramp introduces a new set of supervision signaling protocols in place of the DC current loop. This digital signaling scheme provides greatly expanded functionality suitable to broadband network, and all of the vertical and enhanced (CLASS) services are readily accommodated on all telephone channels. In addition, ATM broadband multimedia services can be accessed on a dial up basis from the local ATM switch, a feature that provides significant economies over the current dedicated connections and associated separate signaling channels.

DESCRIPTION OF DRAWINGS AND FIGURES

This document contains twenty (20) sheets, as follows:

FIG. 1A, Light Ramp Open Ring Architecture, depicts the passive, diversely routed fiber pair connection achieved between the local exchange carrier's Point of Presence(POP) and the premise terminal, the Light Phone unit.

Figure 1B:
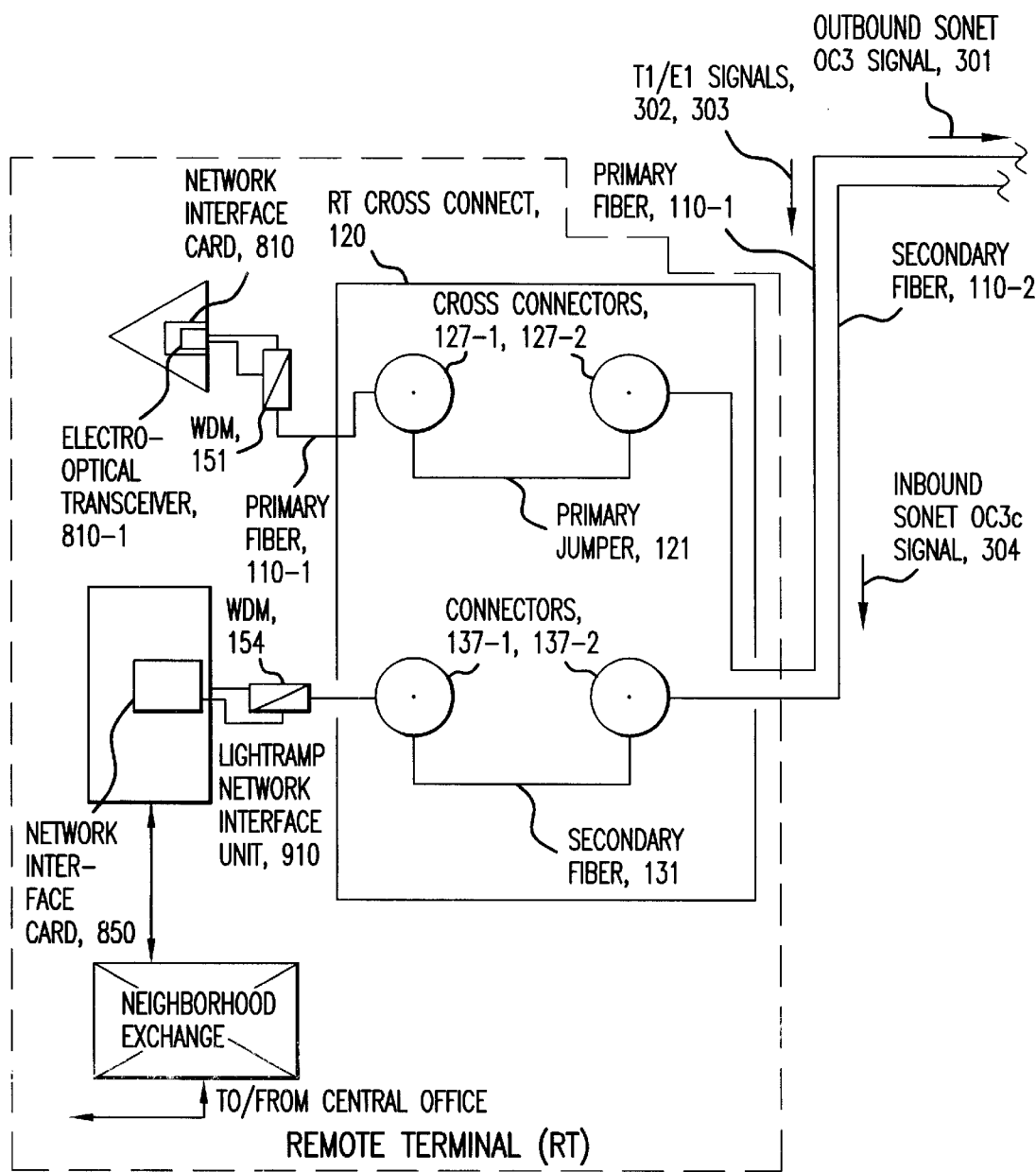

FIG. 1B, Highlights of Fiber Ring Interface to the RT, shows the connection between the fiber and electro-optics at the POP/RT for a single fiber pair.

Figure 1C:
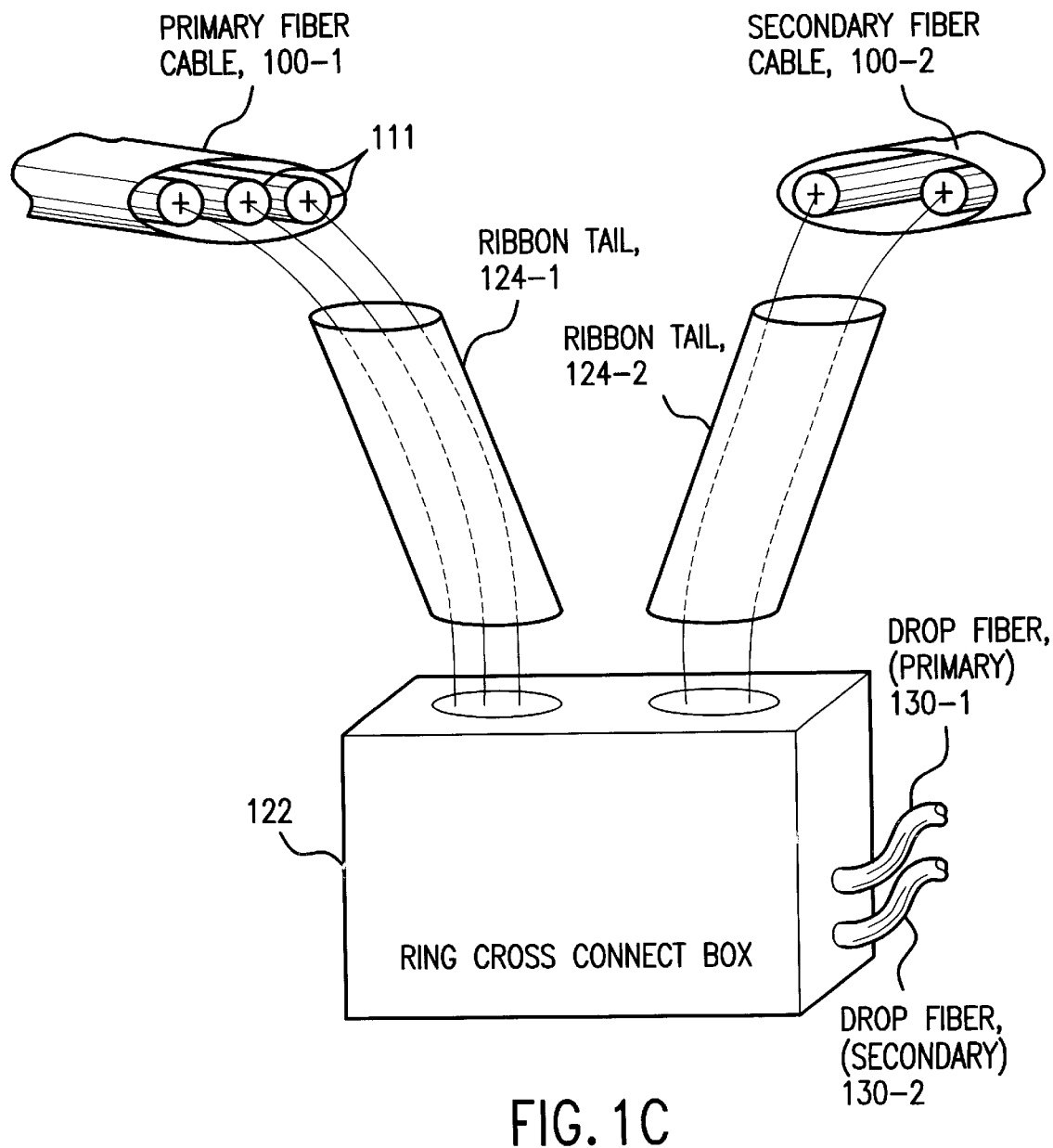

FIG. 1C, Optical Ring Interface to Distribution Cross Connect Box, shows 12 fiber ribbon extensions, fused to the free ends of the severed ring ribbon, making connections in the pole mounted junction box located nearest to the subscriber.

Figure 1D:
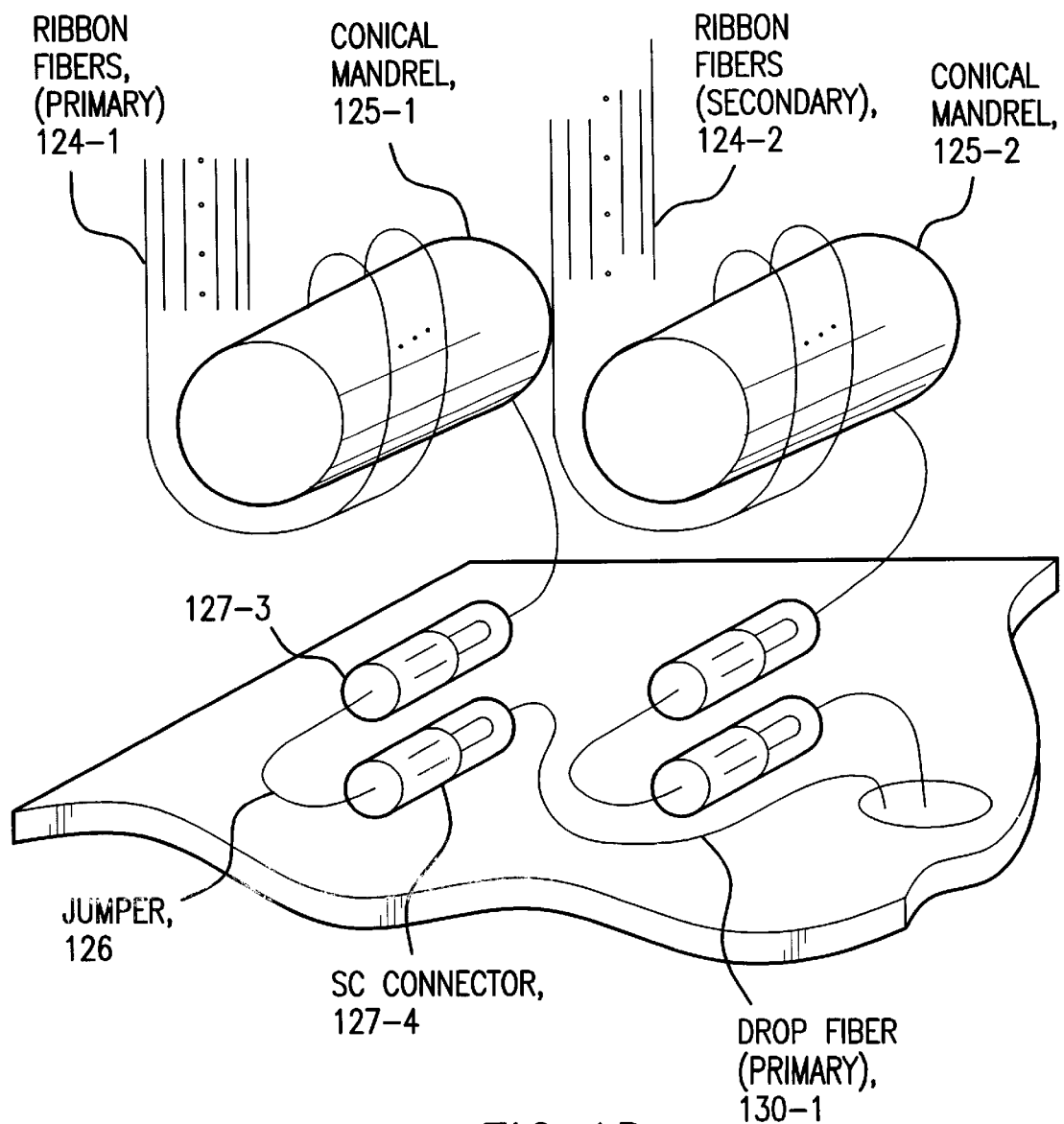

FIG. 1D, Details of Cross Connect Box at the Ring-Distribution Interface, shows the securing and feeding of primary fibers through a cross connection panel with connections to outgoing three pair final distribution cables made using single mode fiber jumpers terminated by SC connectors.

Figure 1E:
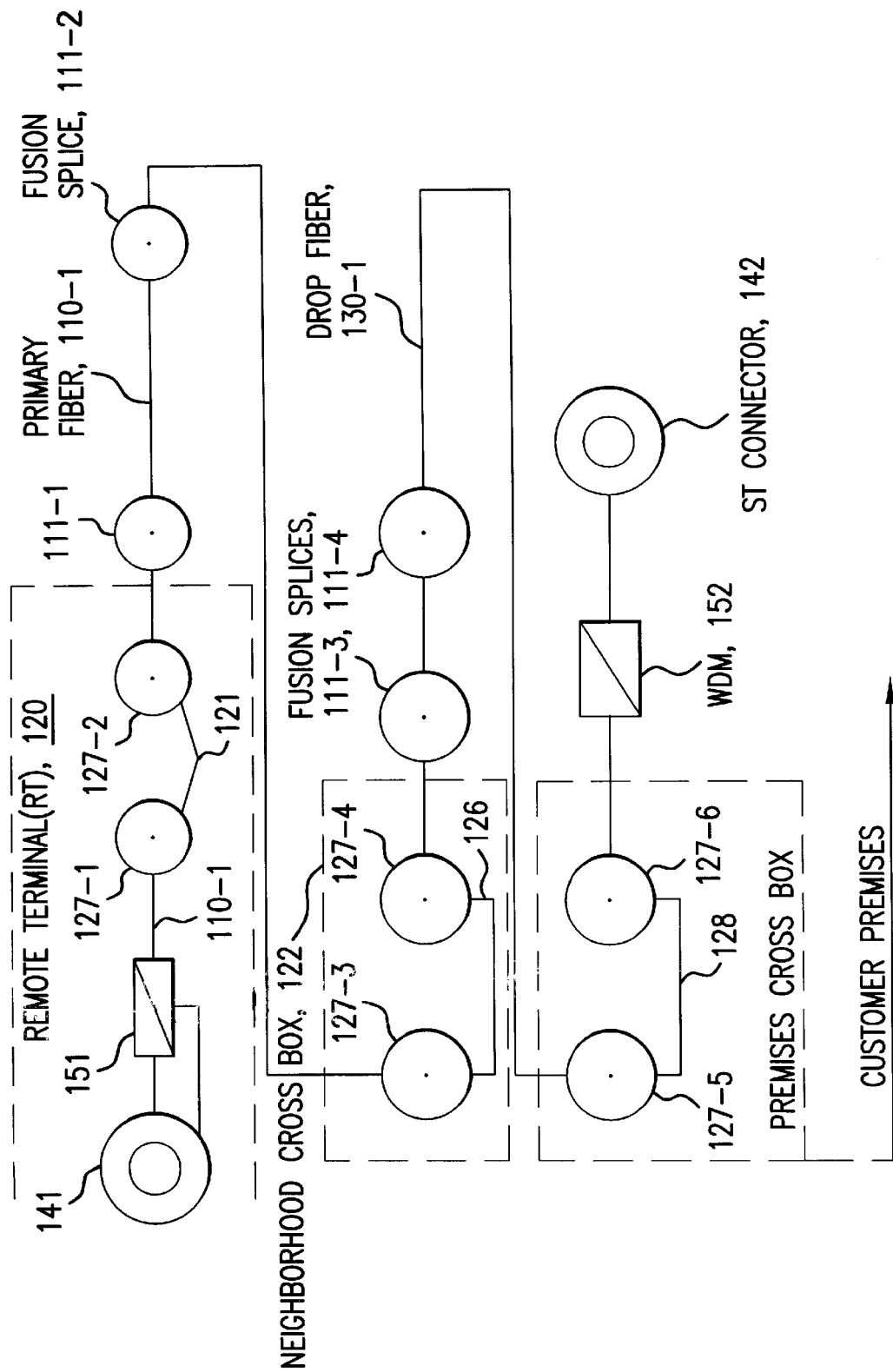

FIG. 1E, Linear Model of primary Optical Link, indicates the individual optical components comprising the link, their connection, and the signal flow.

FIG. 2A, Mapped into SONET/SDH STS-3C Signal, shows the SONET OC3 Frame carrying the undifferentiated standard 53 byte STM (or ATM) cells, again indicating how the payload capacity available for each service is provided.

FIG. 2A, Light Ramp 2000 Access Frame On the 820 nm Basic Services Return Leg, shows one sample provided for a subscriber within the modified ISDN Primary Rate Interface Frame, showing the S signaling channel along with ISDN Standard D channel signaling.

Figure 2B:
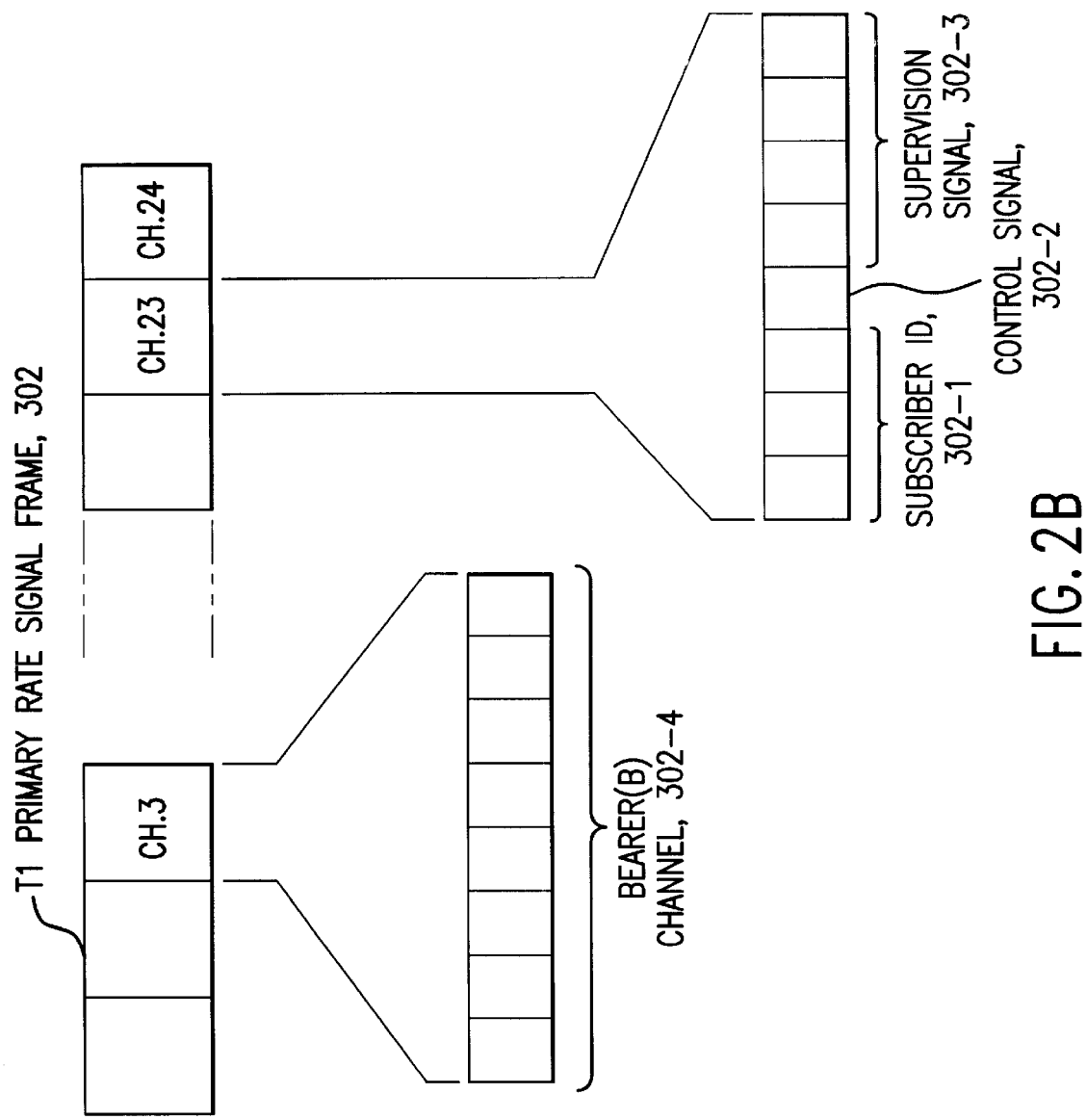
Figure 2C:
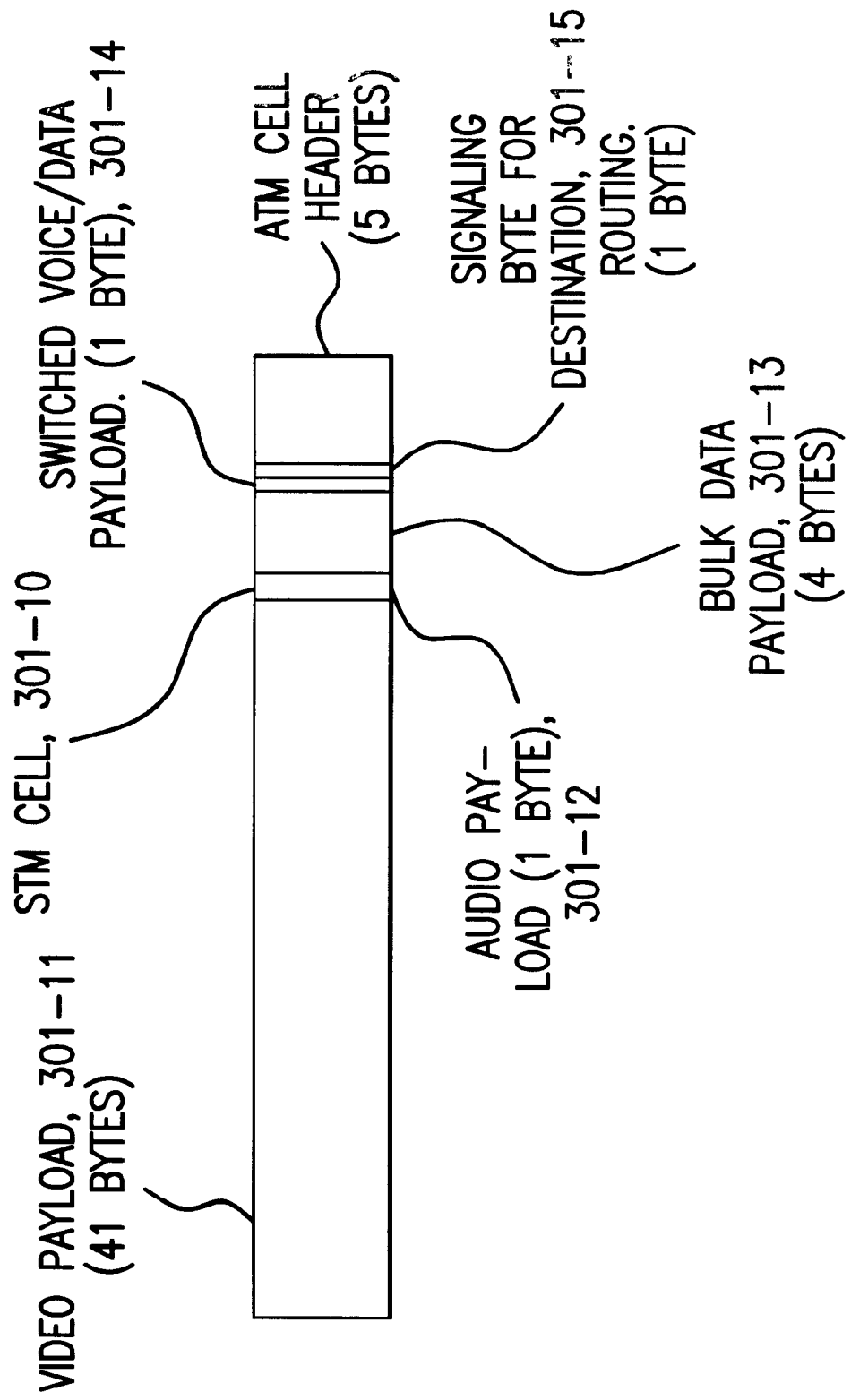

FIG. 2C, Light Ramp 2000 STM Cell showing allocation of capacity between signaling(one byte) and the 47 byte combined payload, indicating conveyance of video, audio, bulk data, and switched voice/data, alone with the signaling byte containing destination routing bits.

Figure 3A:
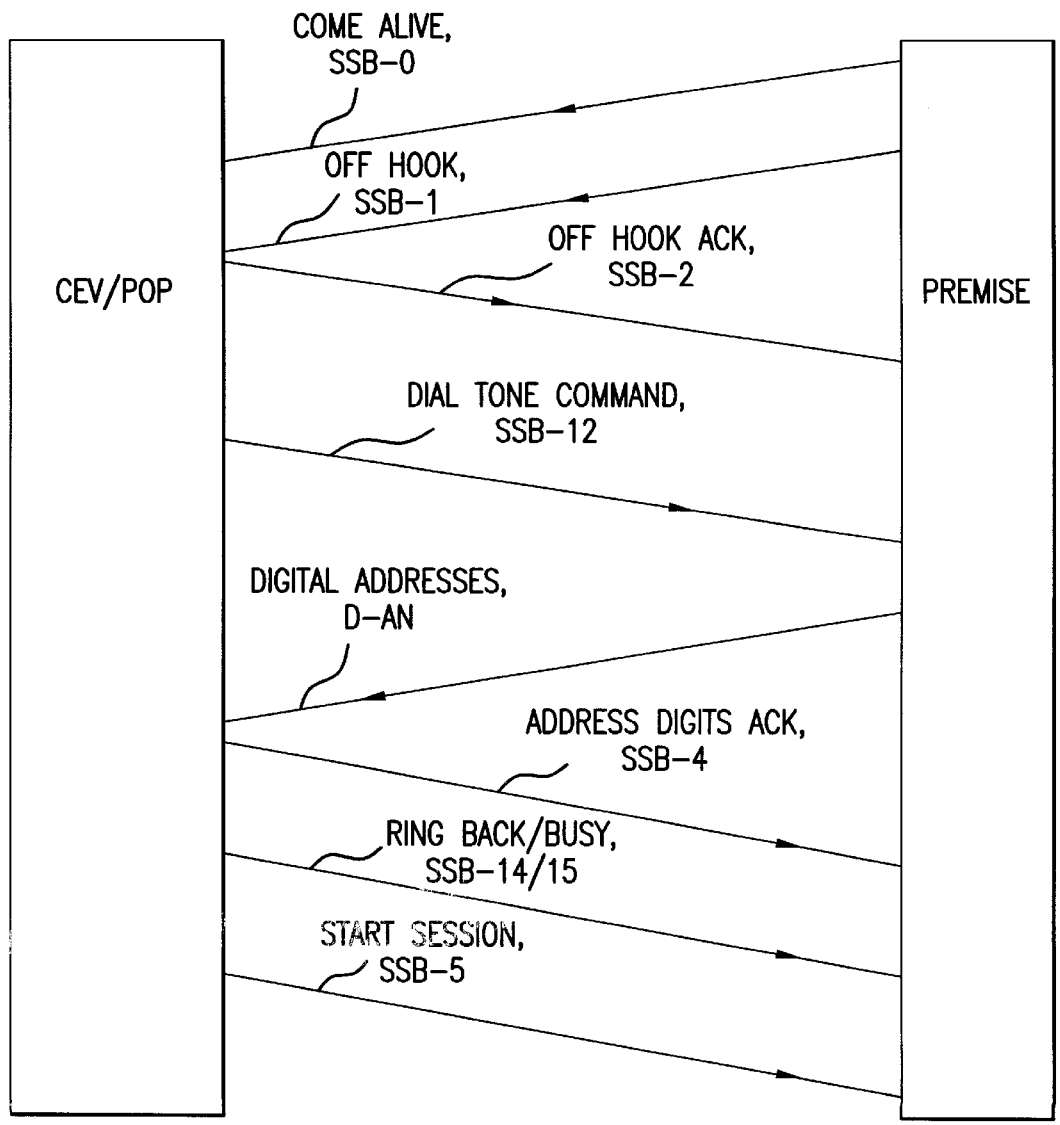
Figure 3B:
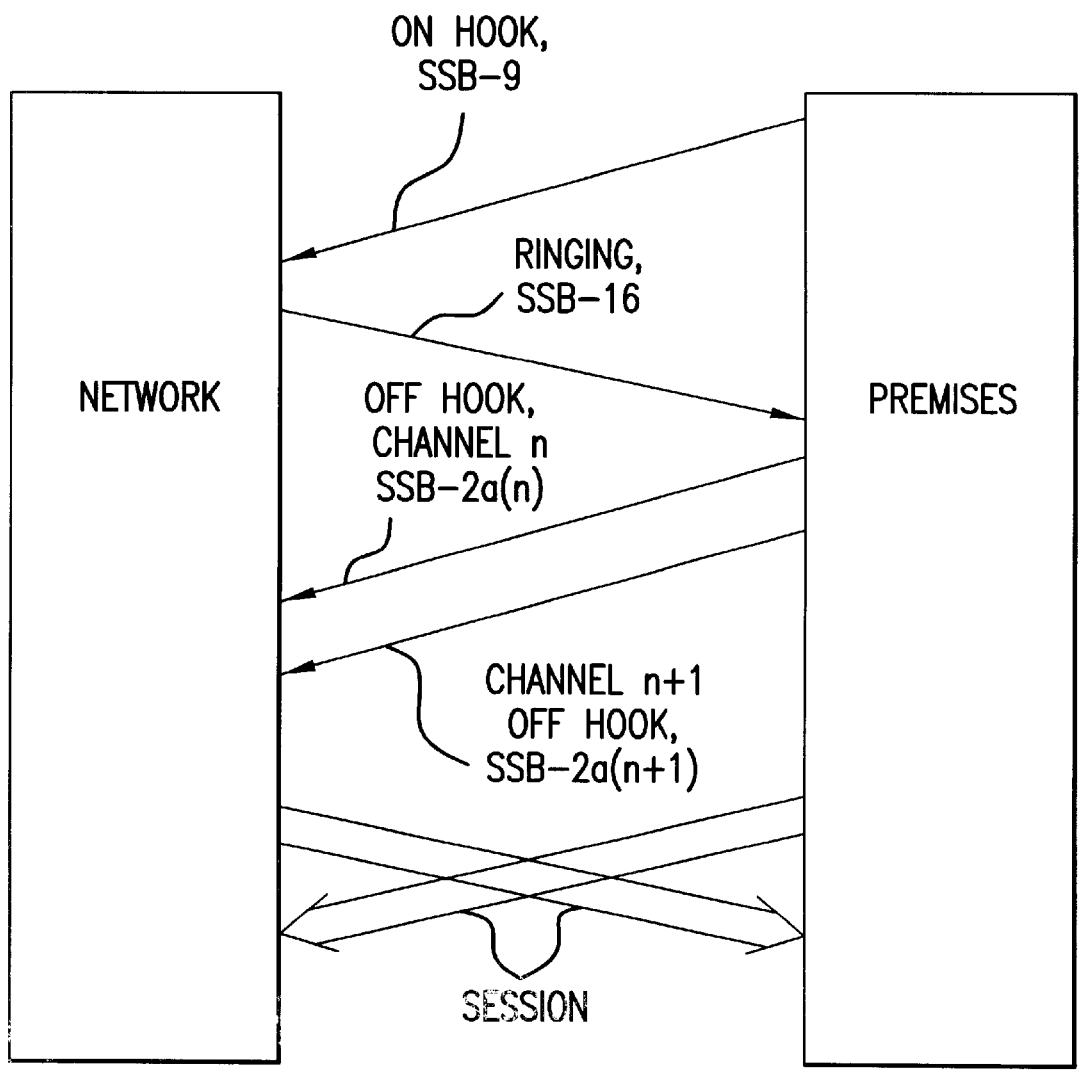
Figure 3C:
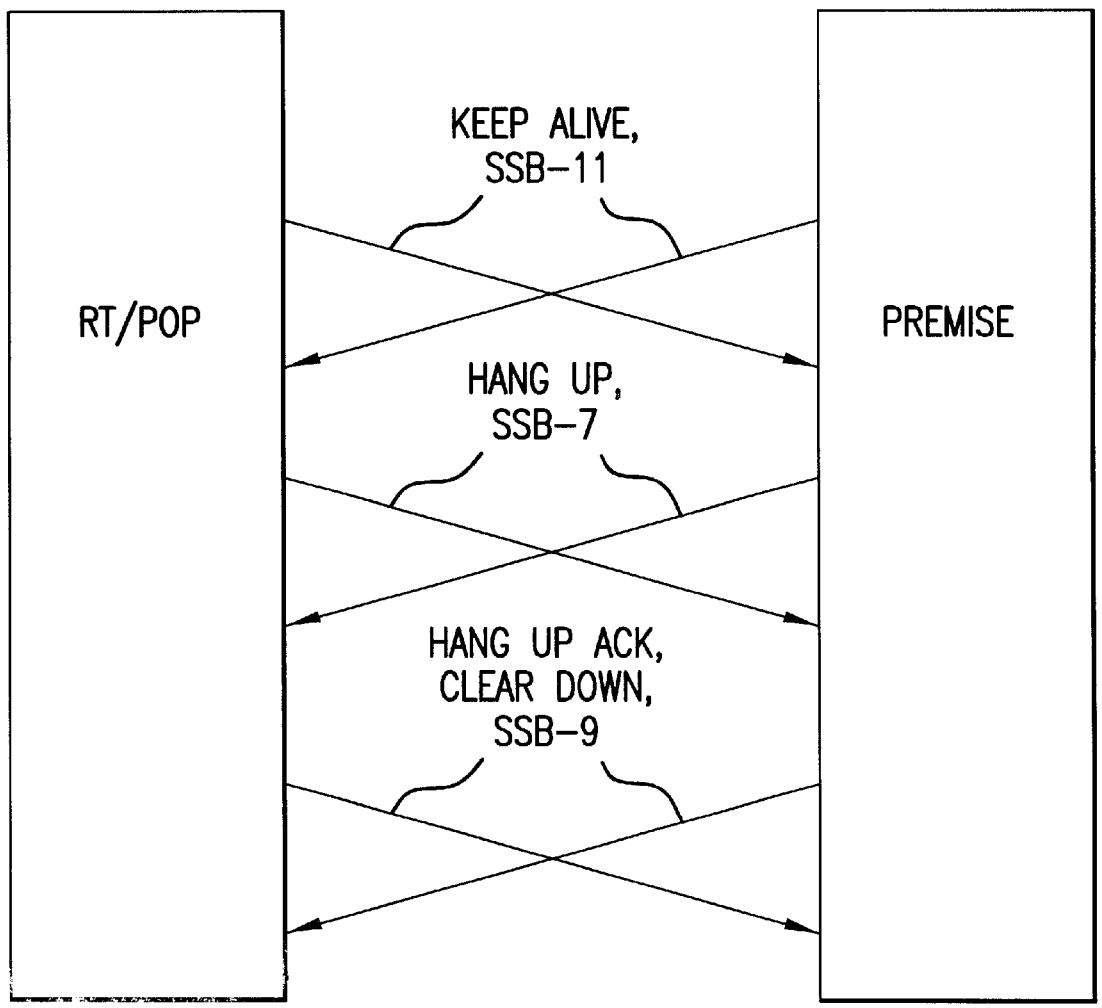

FIGS. 3A, 3B, and 3C, Digital Signaling Diagram for Outgoing ISDN Call, indicates Light Ramp 2000 messages flowing between premise terminals and LEC POP equipment during an outgoing ISDN (basic services) call.

Figure 4A:
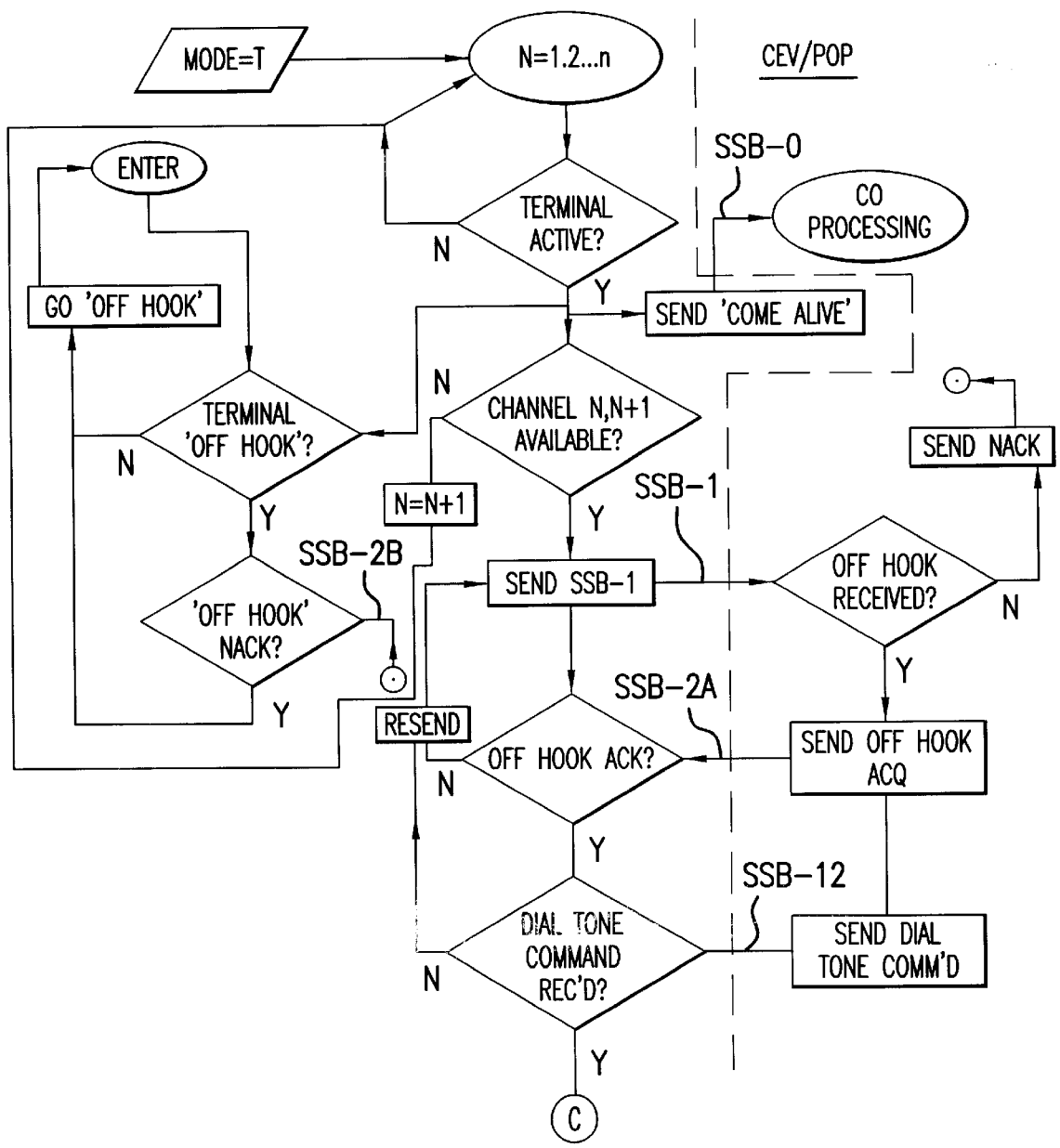
Figure 4B:
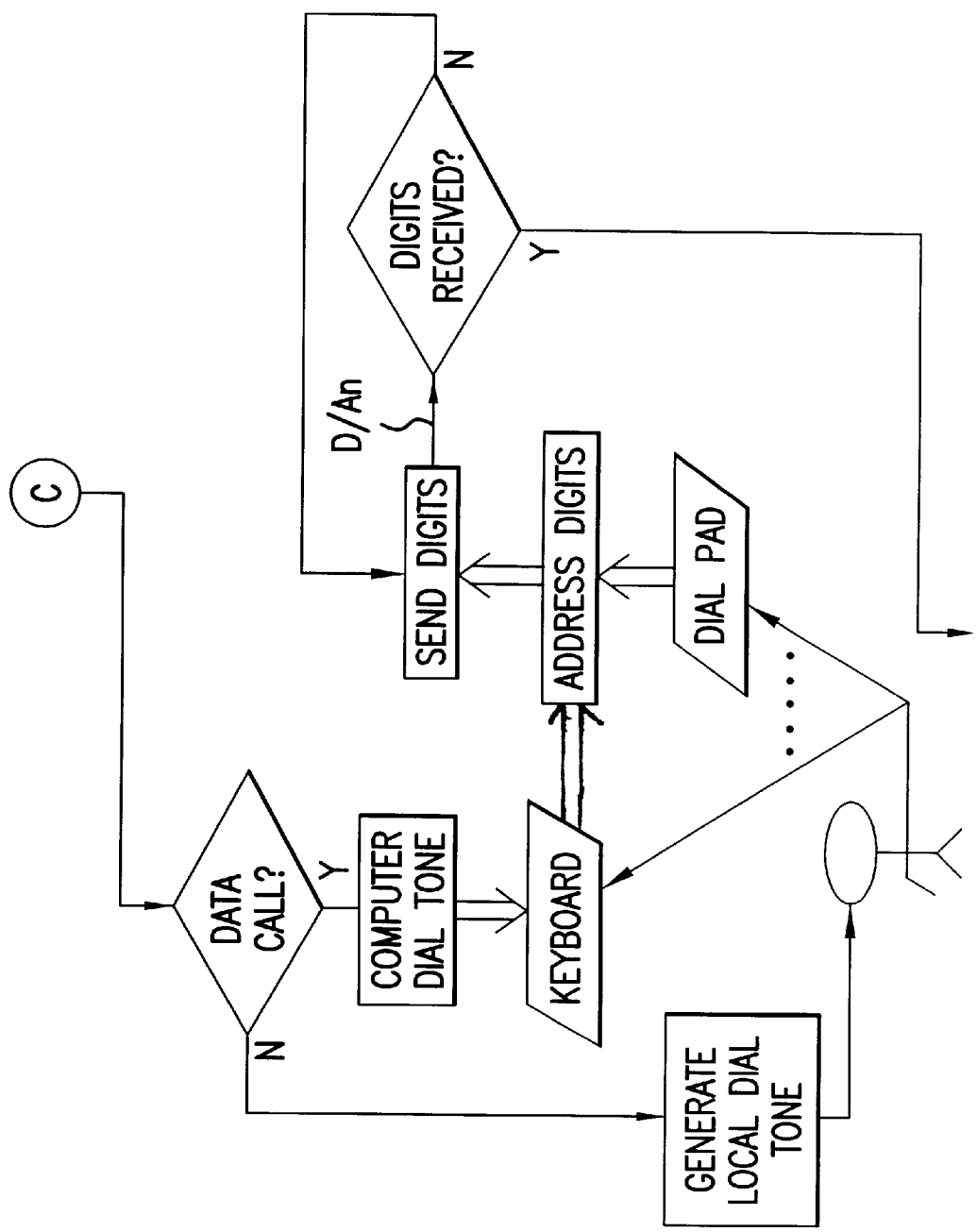
Figure 4C:
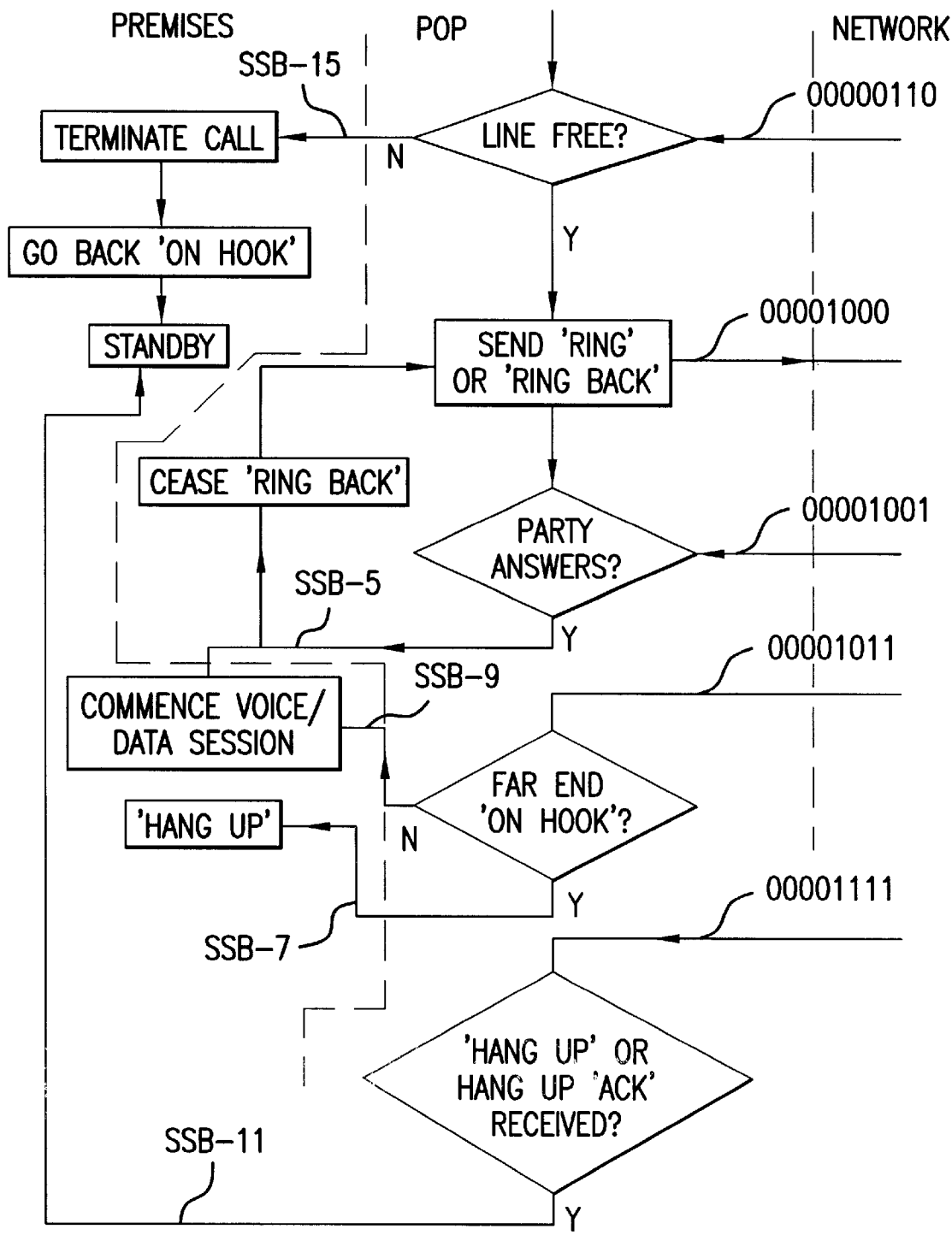

FIGS. 4A, 4B, and 4C Software Flow for Basic Service shows the software logic flow for controlling call placement over the primary Light Ramp fiber.

Figure 5A:
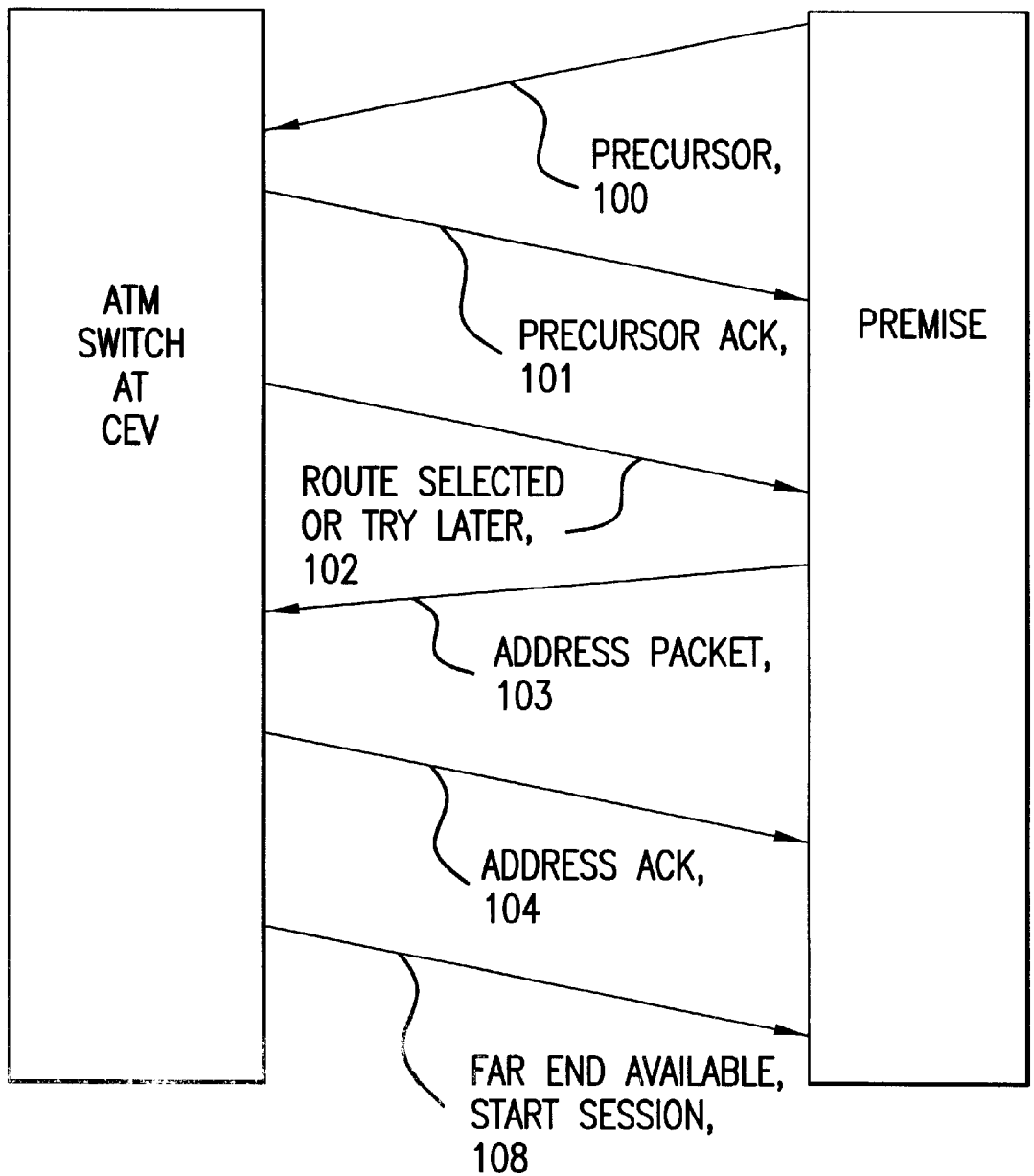
Figure 5B:
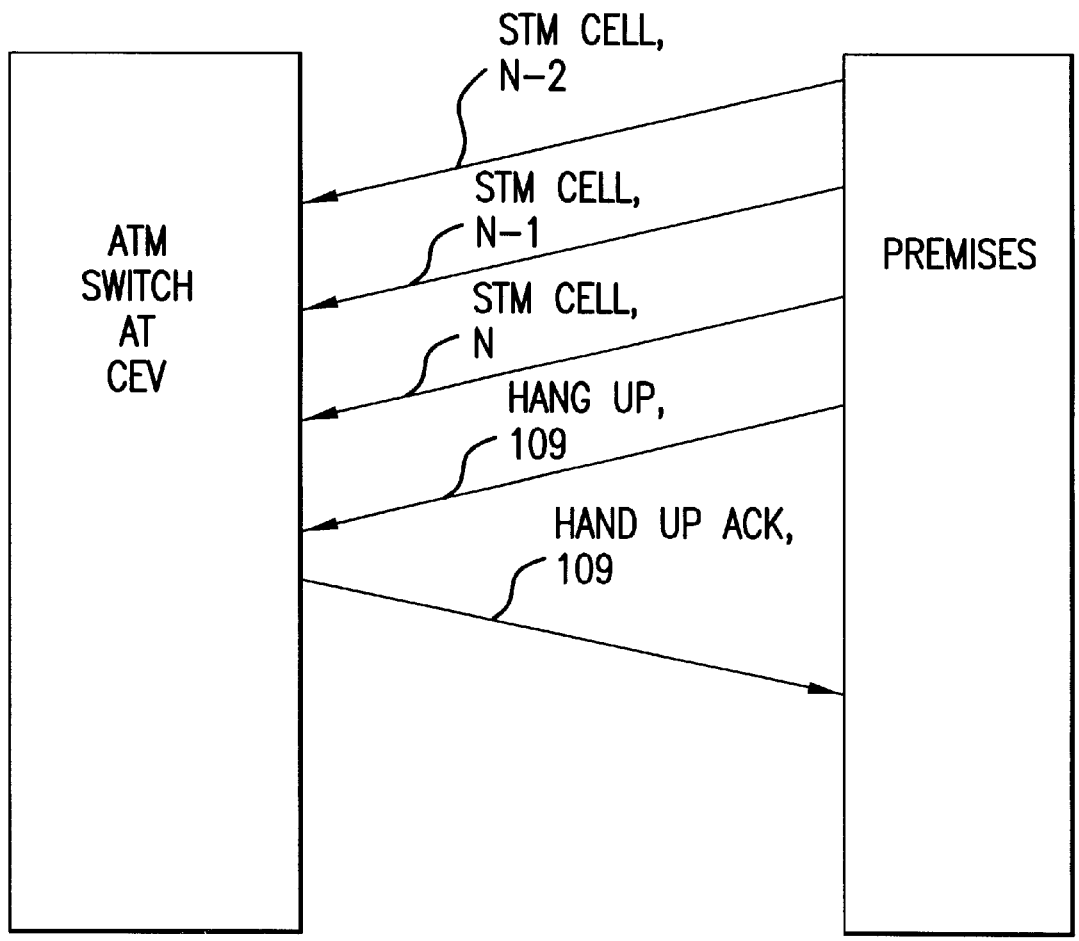

FIGS. 5A and 5B, Signaling Diagram for Multi-media Services, shows message flow for STM calls over the fiber pair.

Figure 6A:
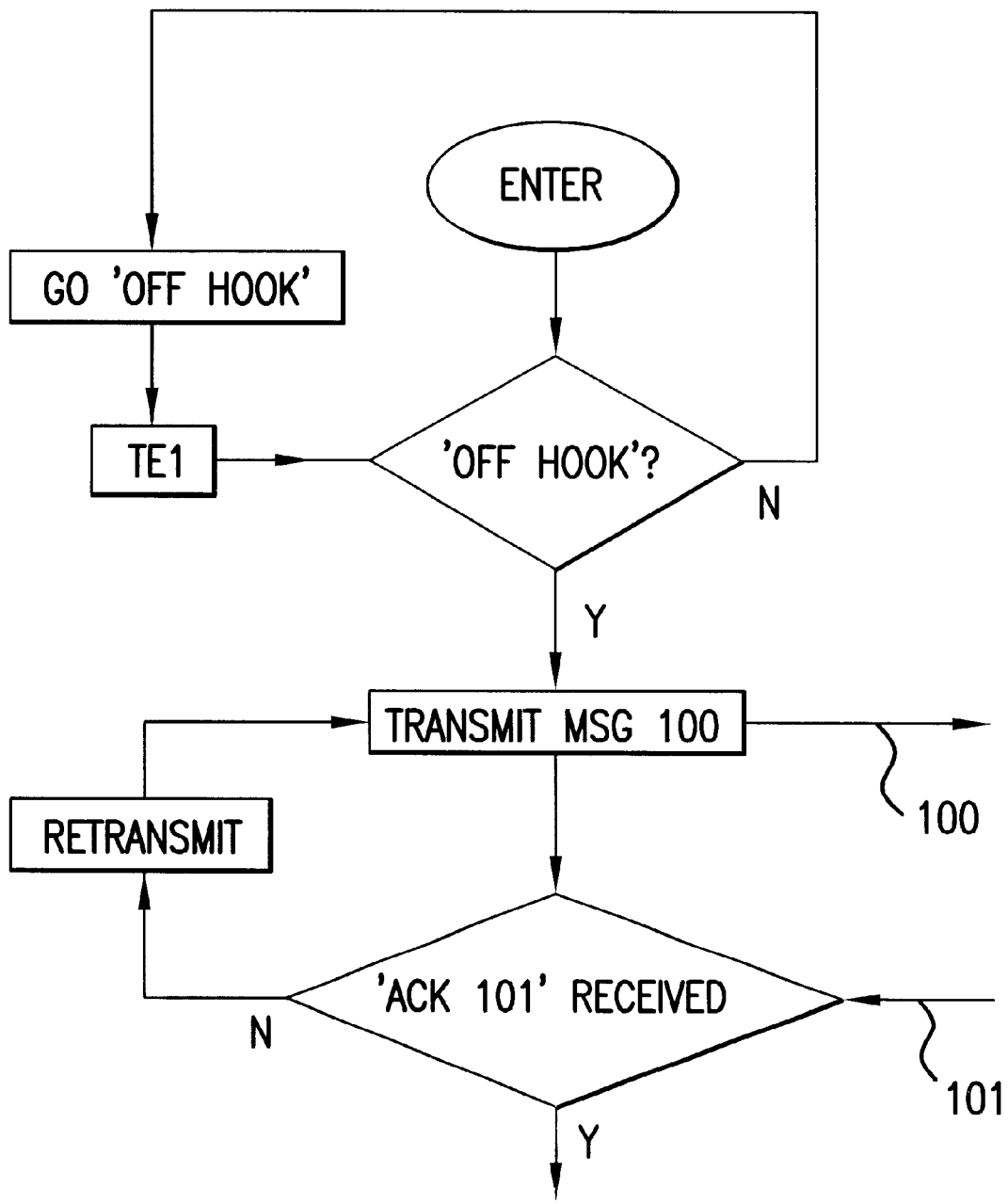
Figure 6B:
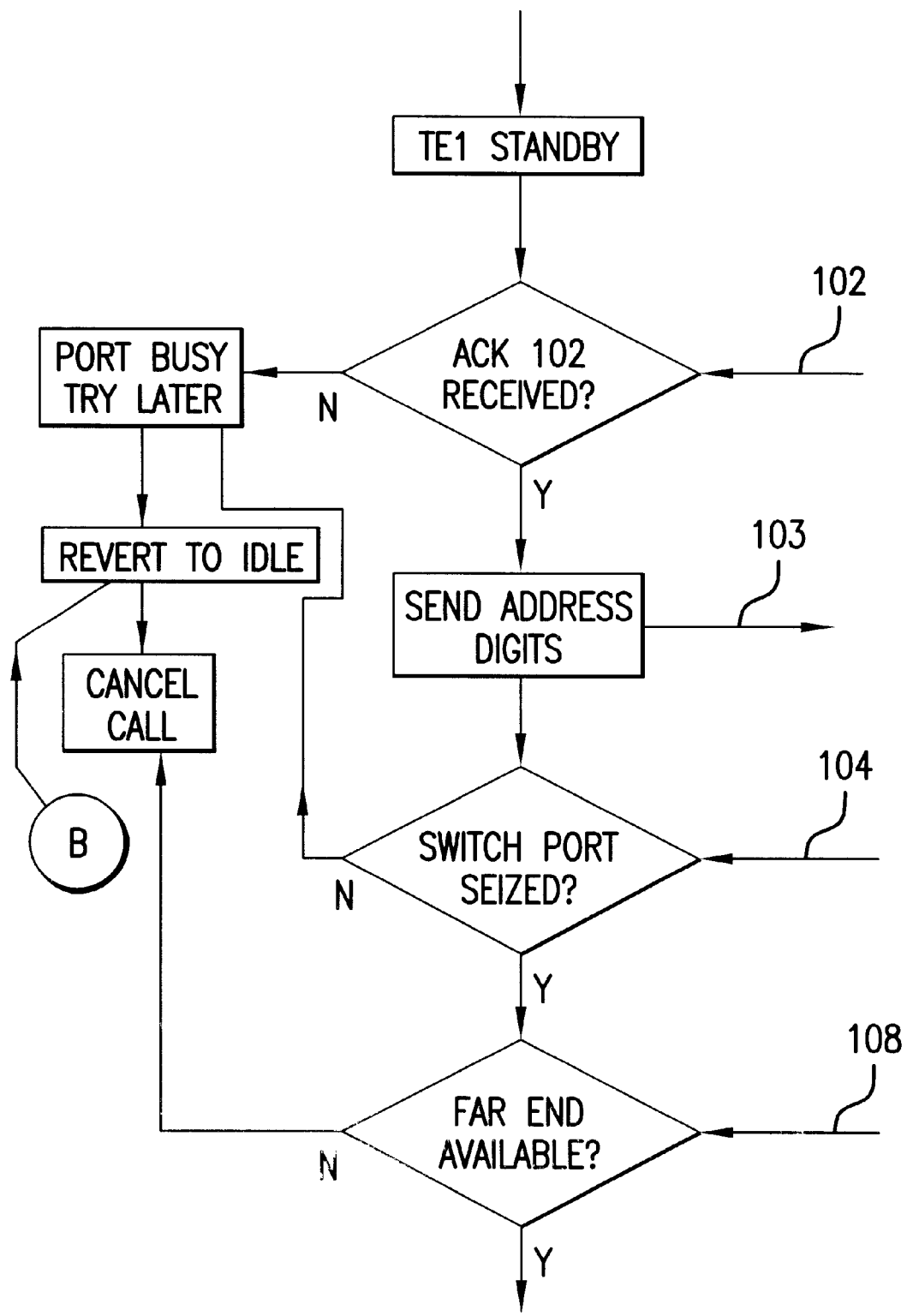
Figure 6C:
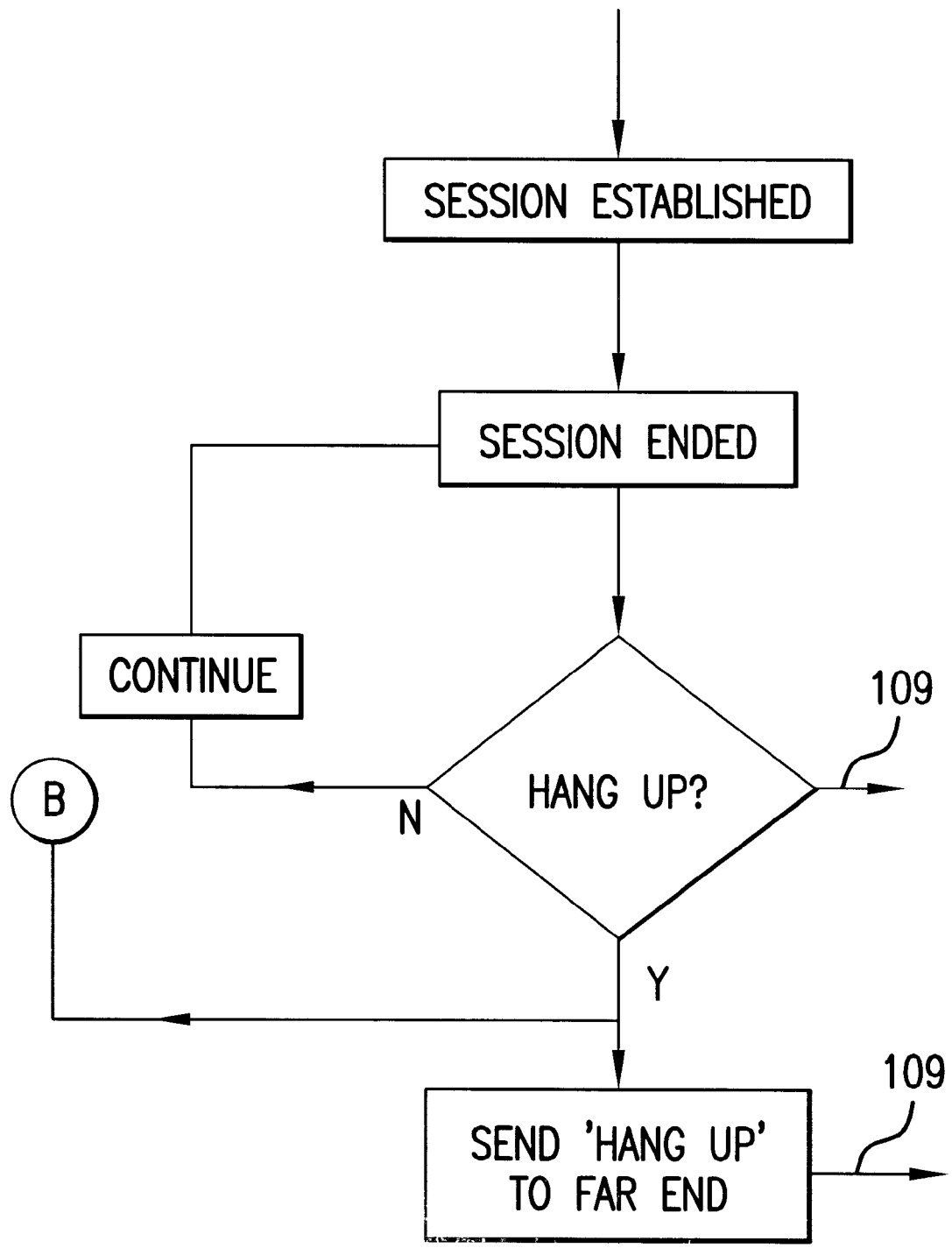
Figure 6D:
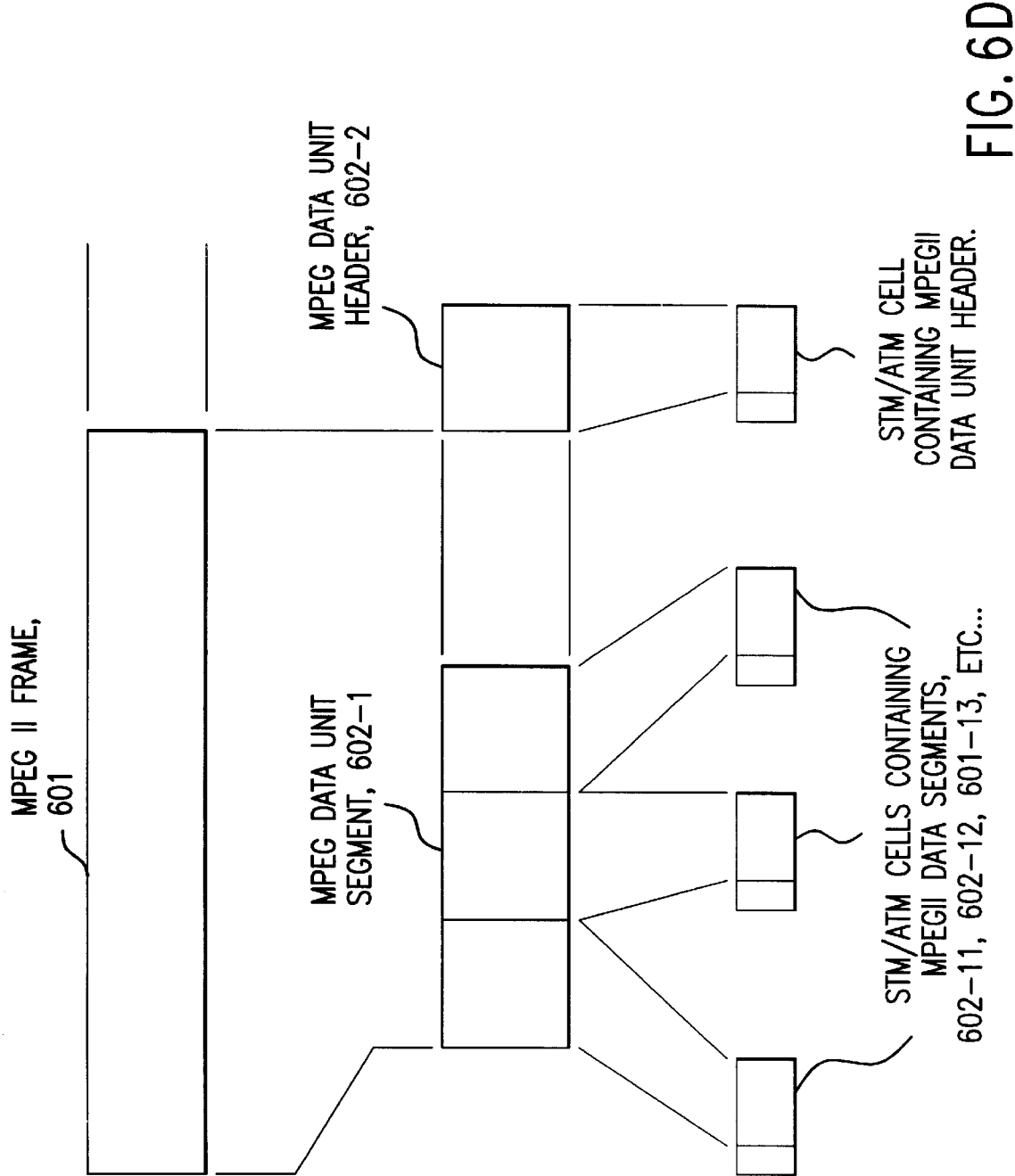

FIGS. 6A, 6B, and 6C Multi-media Signaling Software Flow, shows software logic at both premise and POP Port Contender Unit(PCU), linked by the exchange of digital signaling messages FIG. 6D, Mapping Into ATM packets via AAL-5, shows the segmentation of an MPEG-2 compressed entertainment video packet into a AAL-5 Data Unit which is then further segmented into ATM cells.

DETAILED DESCRIPTION OF LIGHT RAMP 2000

Light Ramp 2000 is an architectural and signaling scheme employing passive fiber in a ring configuration. cabled in quantities of 144 fibers/bundle (typically), and looping through a serving area containing 125 residences or premises. The ring subtends to/from a local concentrator, the Remote Terminal (RT). This local node is typically a Controlled Environment Vault (CEV) which is peripheral to the Central Office(CO) switch and serves as the carrier's Point Of Presence (POP). The POP is remote from the Central Office by a considerable distance, typically 5–10 miles in rural areas. Note that the backbone trunk fiber connection from the CEV to the CO will be a SONET standard digital signal operating at rates from 155 Mbps(OC-3c) to 622 Mbps(OC-12) or higher. Certain upgrades from DS2 or DS3 to SONET on the existing CO trunk fibers are assumed to have occurred prior to Light Ramp 2000 installation. These upgrades are already planned by the Local Exchange Carriers (LECs).

Best Mode for Carrying Out the Design

Referring to FIG. 1, the end to end connection from the CO to the premise via Light Ramp 2000 shows the passive fiber cables 100-1 and 100-2, each bearing 144 fibers, emanating from the RT and converting at a cross connect point, and extending from there to premises along the route. One of the fibers is devoted to a single premise. After cross connection at the ring cross connect box 122, the selected fiber pair continues within a pair of drop fiber cables 130-1 and 130-2, terminating at a user terminal, either 530, 550, 570, or 590. At the cross connect junction of the ring and the residential side street one of the twelve ring fiber ribbons is cut or split to form two separate fibers arriving over the two arms of the ring. Depicted on FIG. 1C, the ring fibers are spliced to the ribbon tail 124-1 and 124-2, the free ends terminating at an on pole cross connect box 122. There jumpered connections are made to drop fibers.

In most suburban and rural applications of Light Ramp 2000 cross connections from the ring fiber to the drop fibers are made aerially using mechanical or fusion splices or cross connection jumpers. The ring cross connection enclosure 122 containing twelve fiber jumpers provides a connection point for the through optical connection from the ring to the premise along right of way to the subscriber. Thus homes on a given street are passed only by final distribution/drop fibers, each dedicated to a single premise on that street. The drop fibers form a continuous optical path from the ring fiber to the home, where they cross connected at cross box the premises cross box the premise fiber(s). Except for cross connects 120, 122, and 129, all other through connection, if needed, are made using very low loss fusion or mechanical splices. No active electronics are employed anywhere in the fiber drop along the route from CEV to premise. This all optical path is responsible for the greatly increased bandwidth available over Light Ramp, and is another key difference with all other fiber in the loop schemes.

Because the glass fiber does not conduct electrical current conventional electrical DC loop closure line supervision is not operable on fiber and must be replaced by the new Light Ramp 2000 message based supervision protocols.

Referring again to FIGS. 1A and 1B, two signals are conveyed simultaneously in opposite directions, each at a different wavelength. On the primary fiber 110-1, switched telephone and data traffic is carried bidirectionally, along with one way bulk data and one way video and stereo. The secondary fiber 110-2 carries both one and two way advances services, the latter in conjunction with the primary fiber 110-1. Either fiber serves as primary or secondary. In event of an outape on either of the two arms of the ring, the surviving fiber carries the basic services traffic. Each fiber is dedicated to a selected premise, and no sharing or splitting of the signal is attempted or required, this feature leads to simplification the form of less complex and more economical links, particularly since glass fiber is now much less costly that metallic wire.

Referring to FIG. 1E showing a linear model of the primary optical link, in the outbound direction a composite SONET waveforms 301, depicted in FIG. 2A and bearing STM cells containing dedicated payloads for switched voice, switched data, bulk data and video tributaries, emanates at 1300 nm from electro-optical transmitter SS3T 810-1. Signal 301 is a base band unmodulated waveform in which the information bits are scrambled prior to transmission. Transmitter 810-1 and ancillary signal processing circuitry are mounted on the network interface card 810. The signal bearing fiber 110-1 is connected to the source 810 by an ST connector 141. Signal 301 is then introduced into a wavelength division multiplexer (WDM) 151 and reintroduced onto the outbound fiber 110-1. The fiber 110-1 terminates on SC connector 127 at Cross Box 120, located in the CEV. Waveform 301 is then cross connected within the virtual CO/RT by Cross Connect 120, using fiber optic patch cord 121, joining connectors 127-1 and 127-2. Enroute the fiber 110-1 is spliced at 500 meter intervals with fusion splices 111. Each outgoing Supervision Signal is transmitted as a signaling byte embedded within the STM Cell of the SONET frame 301.

Referring again to FIGS. 1C and 1D, as the fiber arrives at the pole mounted Cross Connect 122, it is cleaved and broken. then cross connected to designated drop fibers 130-1 and 130-2 via Jumper 126 and connectors 127-3 and 127-4. The connection from ring fiber 110-1 to Cross Connect 122 is effected by means of two 12 fiber ribbons 124-1 and 124-2, whose pole ends are joined by fusion splices 111 to the broken ring fiber. The preconnectorized free ends of the ribbon 124 are wound around a conical mandrel 125, which secures the ribbon 124 and presents the connector for mounting on a connection plate/patch panel 123 (not shown). The mandrel takes up any slack fiber while preserving a minimum allowable fiber radius of curvature. Terminating at the mating half of the SC connectors 127-3 and 127-4 are final distribution and drop cables 130-1 and 130-2. The distribution/drop cables 130, with fibers contained within either a ribbon or binder group, proceed unimpaired to the premises, but for possible on pole splices 111 (not shown) at the point where the drop fiber exits the pole to the premises. At the premises the Cross Connect jumper 129 between connectors 127-5 and 127-6 performs a final connection to wavelength division multiplexer WDM 152, which extracts the incoming 1300 nm signal. This signal is then presented to the ST connector 142, then to the premises opto-electric receiver contained within terminals 530, 550, 570 or 590.

In the inbound direction either a modified T1 302 or E1 303 signal, depicted on FIG. 2B, is optically generated by transmitter 210 (not shown), then coupled at 810 nm to the fiber 130-1 via WDM 152. This signal then proceeds upstream along fiber 130 via Cross Connect jumper 128, intervening splices 111, and Cross Connect 122. The Signal 302/303 is then demultiplexed on board circuitry in the SONET Multiplexer, and the constituent information bearing tributaries recovered. These tributaries, each representing a switched voice or data channel, are in the DS0 format, at a rate of 64 Kbps. The DS0 tributaries are then introduced to DS0 ports on the network multiplexer or carrier provided distribution frame. They are then transmitted by the carrier to the local exchange switch for routing to the addressed destination. Arriving Supervision Signals 302-3. Control Signal 302-2, and Subscriber ID 302-1, shown on Sheet 7, are recovered from the demultiplexed S channel (channel 23 of Signal 302). Supervision status is conveyed upstream to the carrier central office via Signaling System 7 LAP-D packets over a dedicated signaling channel. Conversions of Supervision Status messages to SS7 format are made within the SONET line card module by its on board microprocessor.

Referring again to FIG. 1B, signals conveyed over the second arm of the broken ring fiber 110-2 are routed in exactly the same manner as signals 301 and 302/3. except that a second 1300 nm signal 304 is used on the upstream (Return) path and a 1500 nm signal is employed on the downstream (Go) path. These signals share the single fiber by means of WDM 154, located at the premise. Optical signals are transmitted and received at the CEV by transceiver 850 (not shown).

Signal format 304 on the Return path is a SONET OC3c as shown on FIG. 2A. This arm of the ring is devoted to advanced services provided by dial up/on demand access to a designated port of a CEV resident ATM switch. Signal 304 accesses this port via the Port Contender unit contained within the Light Ramp Network Interface Unit (LNIU) 910 via cross connect jumper 131 and connectors 137-1 and 137-2.

Referring to FIGS. 3A, 3B and 3C, the signaling sequence indicates the flow of supervision signaling bytes (SSBs) between the premise subscriber and the LEC POP. At the premises end the initiating message, SSB-0, is a come alive message, alerting the network that a terminal is active. This message also alerts the network to the type of call; i.e., voice, data, ISDN, which is used by, Signaling system 7 to allow the network to select the appropriate type of transmission facilities. Routing and circuit selection preferences are also determined. SSB-1 then officially conveys the off hook status message, which is then relayed over SS7 to the central office. The CO responds by sending dial tone command. which is translated by Light Ramp into a dial tone command. SSB-12, The response of the terminal is to transmit Digital Address for the main channel and associated channels, D-AN. These travel over the D channel, channel 24 of the PRI frame. The network responds with messages generated from the destination subscriber's terminal, these include SSB-4. acknowledgment of address digits, and ring back, SSB-14, if the destination is available, or busy, SSB-15, if the destination is not available. Receipt of SS7 00001001 indicates that the destination party has answered, generating message SSB-5 to the calling terminal, prompting commencement of the voice or voice/data session. Continuing on FIG. 3C a hang up at either end of the link, indicated by the exchange of SS7 system clear down message 00001011. triggers an SSB-7 to be generated in both directions. This message, followed by a 'hang up ACK'SSB-9, releases the line, acknowledges the hang up and causes the terminals to go inactive. During the inactive state, subsequent SSB-11 message are sent locally, causing the terminal to 'keep alive'. The SSB-11 message occurs at 8 Khz, providing a convenient timing source to the terminal. Referring to FIG. 3B the incoming call sequence is depicted. Having received a prior 'on hook'SSB-9 status message. the POP generates an SSB16 ringing signal. This is followed by off hook SSB-2a (Channel n) and SSB-2a Channel (n+1). Parallel 64 Kbps voice and data sessions (or two data sessions) then commence. Hang up occurs as on FIG. 3C; with exchange of SSB-7 and SSB-9 messages.

The call processing sequence at the premise terminal is shown on FIGS. 4A, 4B, and 4C. The subscriber initiates a call by entering 'T Mode'on his keyboard, having been prompted. Upon a second prompting the user enters the channel or channels to be utilized. these two manual inputs cause the terminal to go active, resulting in the 'come alive' message SSB-0 to be sent to the local node. In Signaling System 7 the type of call is indicated to the far end (e.g., data call is 001100).

The off hook status message SSB-1 indicated that the two BRI 64 Kbps channels n and n+1 are available; i.e., not busy. If the subscriber's initial choice is not feasible, an iterative loop continues to index n until a usable pair is found. When SSB-1 is received at the POP, an acknowledgement SSB-2a is transmitted to the premises, followed by 'dial tone command' SSB-12. Receipt of SSB-2a and SSB-12 causes the user terminal to generate its own local dial tone. For voice calls this will be a conventional tone pair generated by circuitry on board the ISDN telephone signal processing board contained within premise Light Phone 590, 530, 550, or 570. Otherwise a computer dial tone is generated for data only or voice/data calls. This will be a flashing, message of the user's PC monitor. Call completion is acknowledged by issuance to a call connection ACK SSB-5. The remainder of the call proceeds as previously described, with appropriate SSB messages triggering or implementing each step: line free, ring/ring back, party answering, far end off hook and hang up ACK received. When data or data and voice calls contemplated by 2B+D service are initiated by receipt of computer dial tone, the user then has the option of entering address digits by keyboard action. As noted, these address digits are sent to the POP via the D channel, channel 24 of the T1/SF frame. Since individual channels are separately supervised, the user, during voice and data calls or data only calls, may add channels during the session, or delete them, as required. Otherwise the user may hang up the voice call but allow the data session to continue.

Referring to FIG 5A, signaling messages are indicated in support of the multi-media M Mode operation of Light Ramp. These messages travel between the premise and ATM switch at the POP over separate optical channels, and are in the form of dedicated ATM packets embedded within the SONET OC-3 frame. These packets are conveyed in both directions at 1300 nm.

The terminal equipment TE1 is activated by the user going 'off hook' from his keyboard at the time that service is wanted. A precursor message 100 is then sent to the ATM switch, attempting to seize the ATM port. This message also informs the network of the destination ATM's address and subscriber ID. A response message 101 indicates that message 100 has been received, that a port is available, and that the network has been informed of the imminent arrival of packets. Message 102 from the network, when received, tells the sender that the far end switch and port are available and that route has been selected. The route ID is included as part of the transmit cell header. If the destination is unavailable or if the far end fails the respond. or if the port is busy. the caller is advised to 'try later'. The sending terminal then reverts to 'idle'. A programmed retry occurs later at scheduled intervals. Message 103 is the Address Packet, this is followed by ACK 104, confirming that the local ATM switch port connection is made and that the address is forwarded across the network. Receipt of precursor ACK by the LNIU from the called party, message 106, triggers transmission of message 108 to the subscriber. Receipt of message 110 confirms that the far end is available and call was completed.

Continuing on FIG. 5C, STM cells N, N-1, N-1, etc. are seen transmitted in sequence, following receipt of message 110 and preceding termination of the session by exchange of Hang Up messages 109.

FIG. 6D depicts the use of the M Mode to convey compressed MPEG video, showing how the MPEG frame is segmented into a data unit in 602-1, then into packets 602-11, 602-12, 602-13, etc. The header 602-2 is similarly encapsulated into packet 602-21.

What is claimed is:

1. A neighborhood Broad Band ISDN optical network providing on-demand access to and from customer neighborhood premises and to and from a local exchange carrier telephone network and further supporting two way multimedia digital traffic, said optical network comprising:
   a. an optical trunk from a local exchange carrier's central office or a network hub to a neighborhood;
   b. at the neighborhood end of the optical trunk an exchange comprising a concentrating node for CO switched traffic and an asynchronous transfer mode switch for routing multimedia traffic to and from the customer premises;
   c. a passive optical ring looping around the neighborhood from the exchange and split at the exchange so as to have a first end and a second end, the first end of said optical ring connected within the exchange by means of an optical cross connection panel to the asynchronous transfer mode switch and the second end of said optical ring connected to the concentrating node in the exchange, said optical ring comprising an express entry cable containing a plurality of individual fibers, said ring further comprising a plurality of pole mounted or manhole customer cross connection boxes distributed along the ring and located in the vicinity of a customer being served;
   d. at each of the plural customer cross connection boxes a customer fiber optic interface, said interface comprising an optical cross connection panel for conveying incoming digital streams to and from each customer fiber;
   e. from each customer cross connection box to each premises a drop fiber pair comprising a primary fiber and a secondary fiber, the primary fiber having a cross connection box end and a premises end and the secondary fiber having a cross connection box end and a premises end;
   f. connected at each of the primary fiber cross connection box end and primary fiber premises end and the secondary fiber cross connection box end and secondary fiber premises end a wavelength division multiplexer mixing the two traffic streams on each of the primacy fiber and the secondary fiber, and signal processing circuitry to administer line supervision signaling over a customer optical connection; and
   g. an on-premises terminal directly connected to the drop fibers of one of the plural cross connect boxes by a pair of jumper fibers, each jumper fiber of which pair is linked to a corresponding fiber of the drop fiber pair by an optical interface, said on-premises terminal being capable of optical transmission and reception, seizing the optical line using stored supervision signaling messages, and dialing up either the central office or the neighborhood hub.

2. The neighborhood Broad Band ISDN optical network of claim 1 in which the concentrating node comprises a SONET multiplexer containing a plurality of optical interface modules, each such module providing for transmission of OC3c traffic at one wavelength and reception of SF traffic at a second wavelength, whereby switched arriving digital traffic is aggregated and whereby traffic received over the optical trunk is disaggregated.

3. The neighborhood Broad Band ISDN optical network of claim 2 additionally comprising in each of the plural optical interface modules a high speed signal processing circuit for combining and separating signals from diverse sources, for performing supervision signaling over the fiber link, and for executing network control and timing functions.

4. The neighborhood Broad Band ISDN optical network of claim 2 additionally comprising in the exchange an asynchronous transfer mode switch for routing multimedia traffic to and from the customer premises, said traffic consisting of both synchronous and asynchronous transfer mode cells, said asynchronous transfer mode switch further containing an interface unit to terminate optical connections to a second dedicated fiber to each customer premises and to administer access to the switch port from multiple customers, said interface unit containing signal processing circuitry which administers line supervision signaling over the customer optical connection.

5. The neighborhood Broad Band ISDN optical network of claim 2 in which the SONET multiplexer and the on-premises terminal additionally comprise software to carry out supervision functions.

6. The neighborhood Broad Band ISDN optical network of claim 1 in which the optical ring express entry cable contains an plurality of 12-fiber fiber ribbons, each ribbon broken at the cross connection box and terminated at a patch panel within the cross connection box, the cross connection box providing 24 connections, 12 for each of the free ends of the severed ribbon and patch connections for two fibers to each of twelve customer premises.

* * * * *